United States Patent
Zhang et al.

(10) Patent No.: US 11,245,627 B2
(45) Date of Patent: Feb. 8, 2022

(54) TRAFFIC DISTRIBUTION METHOD AND APPARATUS IN HYBRID ACCESS NETWORK

(71) Applicant: Huawei Technologies Co., Ltd., Shenzhen (CN)

(72) Inventors: Dongxia Zhang, Nanjing (CN); Xia Zhu, Nanjing (CN); Jianghua Luo, Shenzhen (CN); Jian Cheng, Nanjing (CN); Mingui Zhang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/206,619

(22) Filed: Nov. 30, 2018

(65) Prior Publication Data
US 2019/0097934 A1    Mar. 28, 2019

Related U.S. Application Data

(63) Continuation of application No. PCT/CN2017/083495, filed on May 8, 2017.

(30) Foreign Application Priority Data

May 31, 2016   (CN) .......................... 201610379123.X

(51) Int. Cl.
*H04L 12/803* (2013.01)
*H04L 12/801* (2013.01)
(Continued)

(52) U.S. Cl.
CPC ........ *H04L 47/125* (2013.01); *H04L 12/4633* (2013.01); *H04L 43/12* (2013.01);
(Continued)

(58) Field of Classification Search
CPC ..................................................... H04L 47/125
(Continued)

(56) References Cited

U.S. PATENT DOCUMENTS 8,072,901 B1 * 12/2011 Blair ...................... H04L 45/70
370/254
2012/0176908 A1   7/2012 Lee
(Continued)

FOREIGN PATENT DOCUMENTS

CN            101150503 A        3/2008
CN            101646196 A        2/2010
(Continued)

OTHER PUBLICATIONS

Machine Translation and Abstract of Chinese Publication No. CN101150503, Mar. 26, 2008, 16 pages.
(Continued)

*Primary Examiner* — Kevin T Bates
*Assistant Examiner* — Emad Siddiqi
(74) *Attorney, Agent, or Firm* — Conley Rose, P.C.

(57) ABSTRACT

A traffic distribution method and apparatus in a hybrid access network, where the method includes transmitting, by a hybrid access aggregation point (HAAP), probe traffic using a second tunnel after determining that a first tunnel is congested when user traffic is transmitted over the first tunnel, obtaining, by the HAAP, a status of the first tunnel and a status of the second tunnel, determining, by the HAAP according to the status of the first tunnel and the status of the second tunnel, whether the status of the first tunnel and the status of the second tunnel meet an offloading condition, and transmitting, by the HAAP, the user traffic using the first tunnel and the second tunnel after determining that the status of the first tunnel and the status of the second tunnel meet the offloading condition.

20 Claims, 10 Drawing Sheets

(51) Int. Cl.
*H04W 28/08* (2009.01)
*H04L 12/46* (2006.01)
*H04L 12/26* (2006.01)
*H04L 12/931* (2013.01)

(52) U.S. Cl.
CPC ............ *H04L 47/11* (2013.01); *H04L 47/122* (2013.01); *H04L 49/501* (2013.01); *H04W 28/08* (2013.01); *H04L 2212/00* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 2014/0328161 | A1* | 11/2014 | Haddad | ................ H04L 12/287 370/219 |
| 2015/0156034 | A1 | 6/2015 | Imai et al. | |
| 2015/0372922 | A1* | 12/2015 | He | ........................ H04L 47/125 370/235 |
| 2017/0150401 | A1 | 5/2017 | Guo et al. | |

FOREIGN PATENT DOCUMENTS

| | | | |
|---|---|---|---|
| CN | 101741736 | A | 6/2010 |
| CN | 101753546 | A | 6/2010 |
| CN | 102571302 | A | 7/2012 |
| CN | 102572905 | A | 7/2012 |
| CN | 103428716 | A | 12/2013 |
| CN | 104158761 | A | 11/2014 |

OTHER PUBLICATIONS

Machine Translation and Abstract of Chinese Publication No. CN101646196, Feb. 10, 2010, 22 pages.
Machine Translation and Abstract of Chinese Publication No. CN101753546, Jun. 23, 2010, 13 pages.
Foreign Communication From A Counterpart Application, Chinese Application No. 201610379123 X, Chinese Office Action dated Jun. 10, 2019, 10 pages.
Machine Translation and Abstract of Chinese Publication No. CN101741736, Jun. 16, 2010, 12 pages.
Machine Translation and Abstract of Chinese Publication No. CN102572905, Jul. 11, 2012, 12 pages.
Machine Translation and Abstract of Chinese Publication No. CN103428716, Dec. 4, 2013, 19 pages.
You, J., et al., "Traffic Distribution for GRE Tunnel Bonding," draft-you-traffic-distribution-for-bonding-00, Mar. 21, 2016, 8 pages.
Foreign Communication From A Counterpart Application, PCT Application No. PCT/CN2017/083495, English Translation of International Search Report dated Jul. 28, 2017, 2 pages.
Foreign Communication From A Counterpart Application, PCT Application No. PCT/CN2017/083495, English Translation of Written Opinion dated Jul. 28, 2017, 5 pages.
Zhang, M., et al., "Flow Control for Bonding Tunnels," draft-zhang-banana-tcp-in-bonding-tunnels-00.txt, Mar. 21, 2016, 6 pages.
Foreign Communication From A Counterpart Application, European Application No. 17805615.6, Extended European Search Report dated Jan. 30, 2019, 10 pages.

* cited by examiner

TRAFFIC DISTRIBUTION METHOD AND APPARATUS IN HYBRID ACCESS NETWORK

CROSS-REFERENCE TO RELATED APPLICATION

This application is a continuation of International Patent Application No. PCT/CN2017/083495 filed on May 8, 2017, which claims priority to Chinese Patent Application No. 201610379123.X filed on May 31, 2016. The disclosures of the aforementioned applications are hereby incorporated by reference in their entireties.

TECHNICAL FIELD

Embodiments of the present disclosure relate to the communications field, and in particular, to a traffic distribution method and apparatus in a hybrid access network.

BACKGROUND

A hybrid access aggregation point (HAAP) is a router node deployed for cooperating with a hybrid access (also referred to as HA) scheme. The HAAP is configured to implement a dual-tunnel hybrid access network in which each home gateway (also referred to as HG) user bonds a digital subscriber line (DSL) with a Long Term Evolution (LTE) system.

In an existing HA scheme, a bandwidth of an original DSL link is reserved, and a network bandwidth is expanded using an LTE resource. Further, a user establishes bonding tunnels, an LTE tunnel and a DSL tunnel with an HAAP by means of HG dialing. In this way, the user implements network access using three paths, the LTE tunnel, the DSL tunnel, and the DSL link. From a perspective of a service, user services may be classified into two types, a common Internet access service and a high-priority service. Service traffic of the high-priority service can be transmitted using only the DSL link. Therefore, the high-priority service occupies a part of the bandwidth of the DSL link, and the DSL tunnel occupies a remaining bandwidth. For the common Internet access service, service traffic of the common Internet access service is preferentially transmitted using the DSL tunnel, and is offloaded to the LTE tunnel when a bandwidth of the DSL tunnel is inadequate. After the LTE tunnel and the DSL tunnel are successfully established between an HG and the HAAP, dual-tunnel bonding is automatically enabled by default and user service traffic is offloaded in a packet-based manner. In an offloading process, because the user service traffic is forwarded in a packet-based manner, a sequence preserving mechanism is used to overcome a problem that packets are out of order at a peer device because of a delay difference between the LTE tunnel and the DSL tunnel. A sequence number is added to each packet such that after receiving the packet, the peer device uses the sequence number to restore a sequence of packets that are out of order after being offloaded in a packet-based manner.

However, when the delay difference between the LTE tunnel and the DSL tunnel is excessively large, the peer device is always in a wait state after receiving a forwarded packet, or directly sends out-of-order packets after a sequence preserving delay is exceeded. In this way, a system throughput fluctuates back and forth, and consequently, a dual-tunnel bandwidth is lower than a single-tunnel bandwidth.

SUMMARY

In view of this, embodiments of the present disclosure provide a traffic distribution method and apparatus in a hybrid access network in order to increase a bandwidth and improve user experience.

According to a first aspect, a traffic distribution method in a hybrid access network is provided, and includes, after determining that a first tunnel is congested when user traffic is transmitted over the first tunnel, transmitting, by an HAAP, probe traffic using a second tunnel, where the probe traffic is traffic, in the user traffic, used to obtain a status of the second tunnel, obtaining, by the HAAP, a status of the first tunnel and the status of the second tunnel, determining, by the HAAP according to the status of the first tunnel and the status of the second tunnel, whether the status of the first tunnel and the status of the second tunnel meet an offloading condition, and after determining that the status of the first tunnel and the status of the second tunnel meet the offloading condition, transmitting, by the HAAP, the user traffic using the first tunnel and the second tunnel.

Further, after the HAAP establishes the first tunnel and the second tunnel with a home gateway, the HAAP may transmit the user traffic using only the first tunnel, and monitor, in real time, whether the first tunnel is congested. When the first tunnel is congested, the HAAP offloads partial user traffic to the second tunnel, that is, transmits the probe traffic using the second tunnel. The probe traffic is used to obtain a status of the second tunnel at a probe stage. When the HAAP transmits the probe traffic using the second tunnel, the HAAP obtains a current status of the first tunnel and a current status of the second tunnel. After the status of the first tunnel and the status of the second tunnel meet the offloading condition, the HAAP transmits the user traffic in a hybrid manner using the first tunnel and the second tunnel.

In this way, the HAAP probes the status of the second tunnel before performing offloading. That is, at a stage of probing the second tunnel, after the offloading condition is met, the HAAP performs offloading transmission using the second tunnel. Therefore, a case in which an overall bandwidth for dual tunnel-based traffic transmission is lower than a bandwidth for single tunnel-based traffic transmission can be avoided in order to improve user experience.

In the first aspect, optionally, the probe traffic may be in a preset proportion to the user traffic, or may be a specified value. A specific value of the probe traffic is not illustrated herein. When the probe traffic is transmitted using the second tunnel, the first tunnel is used for transmission using a common mechanism. In this case, the HAAP obtains the status of the first tunnel and the status of the second tunnel. It should be understood that a tunnel status is different when different-bandwidth traffic is transmitted. The foregoing statuses are particularly current statuses of the first tunnel and the second tunnel when the probe traffic is transmitted using the second tunnel.

Optionally, the status of the first tunnel may include a throughput of the first tunnel and/or a delay of the first tunnel, and the status of the second tunnel may include a throughput of the second tunnel and/or a delay of the second tunnel. Further, when it is determined, according to the status of the first tunnel and the status of the second tunnel, whether the offloading condition is met, determining may be performed using at least one of the following two determining methods. That is, one of the two determining methods is performing determining according to the throughput of the first tunnel and the throughput of the second tunnel in a current status, and the other of the two determining methods is performing determining according to the delay of the first tunnel and the delay of the second tunnel in the current status.

In a first possible implementation of the first aspect, the method further includes, after determining that the status of the first tunnel and the status of the second tunnel do not meet the offloading condition, determining, by the HAAP, whether the status of the first tunnel and the status of the second tunnel meet a backoff condition, and after the HAAP determines that the status of the first tunnel and the status of the second tunnel meet the backoff condition, determining, by the HAAP, whether the first tunnel is congested.

Further, after determining that the status of the first tunnel and the status of the second tunnel do not meet the offloading condition, the HAAP may further determine whether the status of the first tunnel and the status of the second tunnel meet the backoff condition. It should be understood that the backoff condition is used to indicate whether the HAAP is allowed to return to a status in which the HAAP transmits the user traffic using only the first tunnel and monitors, in real time, whether the first tunnel is congested. If the status of the first tunnel and the status of the second tunnel meet the backoff condition, the HAAP may transmit the user traffic using only the first tunnel, and detect, in real time, whether the first tunnel is congested. If the status of the first tunnel and the status of the second tunnel meet neither the backoff condition nor the offloading condition, the HAAP may transmit the user traffic using only the first tunnel, and may not detect, within specific duration, whether the first tunnel is congested.

With reference to the foregoing possible implementation of the first aspect, in a second possible implementation of the first aspect, the method further includes, after the HAAP determines that the status of the first tunnel and the status of the second tunnel do not meet the backoff condition, transmitting, by the HAAP, the user traffic using the first tunnel, and skip performing congestion determining on the first tunnel within preset duration.

Optionally, when entering a status in which the HAAP transmits the user traffic using only the first tunnel, but does not detect whether the first tunnel is congested, the HAAP may start a timer. After the timer expires, the HAAP is switched to the status in which the HAAP transmits the user traffic using only the first tunnel and detects, in real time, whether the first tunnel is congested.

In this way, after the HAAP transmits the probe traffic using the second tunnel, if the HAAP determines that the status of the first tunnel and the status of the second tunnel do not meet the offloading condition in the current status, the HAAP does not offload the user traffic to the second tunnel, but transmits the user traffic using only the first tunnel. Therefore, a case in which an overall bandwidth for dual tunnel-based traffic transmission is lower than a bandwidth for single tunnel-based traffic transmission can be avoided in order to improve user experience.

With reference to the foregoing possible implementations of the first aspect, in a third possible implementation of the first aspect, before determining, by an HAAP, that a first tunnel is congested when user traffic is transmitted over the first tunnel, the method further includes determining, by the HAAP according to a link quality parameter of the first tunnel and a first threshold, whether the first tunnel is congested.

Optionally, the HAAP may set a detection period, a quantity of detection times, and a threshold of a quantity of congestion times, and perform congestion detection for preset times within the detection period. If a quantity of congestion times exceeds the threshold of the quantity of congestion times, the HAAP may determine that the first tunnel is congested.

With reference to the foregoing possible implementations of the first aspect, in a fourth possible implementation of the first aspect, determining, by an HAAP, that a first tunnel is congested when user traffic is transmitted over the first tunnel includes, if the link quality parameter of the first tunnel is greater than the first threshold, determining, by the HAAP, that the first tunnel is congested.

Optionally, if the link quality parameter of the first tunnel is less than or equal to the first threshold, the HAAP determines that the first tunnel is not congested.

With reference to the foregoing possible implementations of the first aspect, in a fifth possible implementation of the first aspect, the link quality parameter of the first tunnel is a packet loss rate of the first tunnel, and the first threshold is a threshold corresponding to the packet loss rate, or the link quality parameter of the first tunnel is a throughput of the first tunnel, and the first threshold is a threshold corresponding to the throughput, or the link quality parameter of the first tunnel includes a packet loss rate of the first tunnel and a throughput of the first tunnel, the first threshold includes a first subthreshold and a second subthreshold, the first subthreshold is a threshold corresponding to the packet loss rate, and the second subthreshold is a threshold corresponding to the throughput.

With reference to the foregoing possible implementations of the first aspect, in a sixth possible implementation of the first aspect, the status of the second tunnel includes a throughput of the second tunnel, and the status of the first tunnel includes a throughput of the first tunnel, and determining, by the HAAP according to the status of the first tunnel and the status of the second tunnel, whether the status of the first tunnel and the status of the second tunnel meet an offloading condition includes determining, by the HAAP, whether a sum of the throughput of the first tunnel and the throughput of the second tunnel is greater than a second threshold, where the second threshold is a threshold corresponding to the sum of the throughput of the first tunnel and the throughput of the second tunnel.

It should be understood that at the stage of probing the second tunnel, the HAAP allocates traffic with a specific proportion to the second tunnel, and remaining traffic is still transmitted in a common offloading manner, that is, first passes through the first tunnel, and is offloaded to the second tunnel when a bandwidth of the first tunnel is inadequate. For example, if the user traffic is 10 megabytes (MB), and the bandwidth of the first tunnel is 5 MB, the HAAP first forcibly allocates 1-M traffic for second tunnel-based transmission, and enters the probing stage. At the probing stage, the HAAP obtains a status of the first tunnel when 5-M traffic is transmitted over the first tunnel and a status of the second tunnel when the 1-M traffic is transmitted over the second tunnel. If the HAAP determines that the status of the first tunnel and the status of the second tunnel meet the offloading condition at the probing stage, the HAAP may transmit 4-M traffic in the 10-M traffic according to a preset policy using the second tunnel. Therefore, if link quality of the second tunnel is good enough, the sum of the throughput of the first tunnel and the throughput of the second tunnel can be kept 10 MB. If link quality of the second tunnel is relatively poor, the user traffic sharply decreases after the second tunnel is used for transmission. The HAAP determines that the status of the first tunnel and the status of the second tunnel do not meet the offloading condition at the probing stage, and temporarily does not use the second tunnel to transmit the user traffic.

With reference to the foregoing possible implementations of the first aspect, in a seventh possible implementation of the first aspect, determining, by the HAAP, that the status of the first tunnel and the status of the second tunnel meet the offloading condition includes, if the sum of the throughput of the first tunnel and the throughput of the second tunnel is greater than the second threshold, determining, by the HAAP, that the status of the first tunnel and the status of the second tunnel meet the offloading condition.

Optionally, if the sum of the throughput of the first tunnel and the throughput of the second tunnel is less than or equal to the second threshold, the HAAP determines that the status of the first tunnel and the status of the second tunnel do not meet the offloading condition.

With reference to the foregoing possible implementations of the first aspect, in an eighth possible implementation of the first aspect, determining whether the status of the first tunnel and the status of the second tunnel meet a backoff condition includes determining, by the HAAP, whether the sum of the throughput of the first tunnel and the throughput of the second tunnel is less than a third threshold, where the third threshold is a threshold corresponding to the sum of the throughput of the first tunnel and the throughput of the second tunnel.

Optionally, the third threshold is less than the second threshold.

With reference to the foregoing possible implementations of the first aspect, in a ninth possible implementation of the first aspect, determining, by the HAAP, that the status of the first tunnel and the status of the second tunnel meet the backoff condition includes, if the sum of the throughput of the first tunnel and the throughput of the second tunnel is less than the third threshold, determining, by the HAAP, that the status of the first tunnel and the status of the second tunnel meet the backoff condition.

With reference to the foregoing possible implementations of the first aspect, in a tenth possible implementation of the first aspect, the status of the second tunnel further includes a delay of the second tunnel, and the status of the first tunnel further includes a delay of the first tunnel, and determining whether the status of the first tunnel and the status of the second tunnel meet a backoff condition includes determining, by the HAAP, whether a difference between the delay of the second tunnel and the delay of the first tunnel is less than a fourth threshold, where the fourth threshold is a threshold corresponding to the difference between the delay of the second tunnel and the delay of the first tunnel.

With reference to the foregoing possible implementations of the first aspect, in an eleventh possible implementation of the first aspect, determining, by the HAAP, that the status of the first tunnel and the status of the second tunnel meet the backoff condition includes, if the sum of the throughput of the first tunnel and the throughput of the second tunnel is greater than or equal to the third threshold, and the difference between the delay of the second tunnel and the delay of the first tunnel is less than the fourth threshold, determining, by the HAAP, that the status of the first tunnel and the status of the second tunnel meet the backoff condition.

With reference to the foregoing possible implementations of the first aspect, in a twelfth possible implementation of the first aspect, the status of the second tunnel includes the throughput of the second tunnel and the delay of the second tunnel, and the status of the first tunnel includes the throughput of the first tunnel and the delay of the first tunnel, and determining, by the HAAP, that the status of the first tunnel and the status of the second tunnel do not meet the backoff condition includes, if the sum of the throughput of the first tunnel and the throughput of the second tunnel is greater than or equal to the third threshold, and the difference between the delay of the second tunnel and the delay of the first tunnel is greater than or equal to the fourth threshold, determining, by the HAAP, that the status of the first tunnel and the status of the second tunnel do not meet the backoff condition, where the third threshold is the threshold corresponding to the sum of the throughput of the first tunnel and the throughput of the second tunnel, and the fourth threshold is the threshold corresponding to the difference between the delay of the second tunnel and the delay of the first tunnel.

With reference to the foregoing possible implementations of the first aspect, in a thirteenth possible implementation of the first aspect, the status of the second tunnel includes a delay of the second tunnel, and the status of the first tunnel includes a delay of the first tunnel, and determining, by the HAAP according to the status of the first tunnel and the status of the second tunnel, whether the status of the first tunnel and the status of the second tunnel meet an offloading condition includes determining, by the HAAP, whether a difference between the delay of the second tunnel and the delay of the first tunnel is less than a fourth threshold, where the fourth threshold is a threshold corresponding to the difference between the delay of the second tunnel and the delay of the first tunnel.

With reference to the foregoing possible implementations of the first aspect, in a fourteenth possible implementation of the first aspect, determining, by the HAAP, that the status of the first tunnel and the status of the second tunnel meet the offloading condition includes, if the difference between the delay of the second tunnel and the delay of the first tunnel is less than the fourth threshold, determining, by the HAAP, that the status of the first tunnel and the status of the second tunnel meet the offloading condition.

Optionally, if the difference between the delay of the second tunnel and the delay of the first tunnel is greater than or equal to the fourth threshold, the HAAP determines that the status of the first tunnel and the status of the second tunnel do not meet the offloading condition.

With reference to the foregoing possible implementations of the first aspect, in a fifteenth possible implementation of the first aspect, the status of the second tunnel includes a throughput of the second tunnel, and the status of the first tunnel includes a throughput of the first tunnel, and determining whether the status of the first tunnel and the status of the second tunnel meet a backoff condition includes determining, by the HAAP, whether a sum of the throughput of the first tunnel and the throughput of the second tunnel is less than a third threshold, where the third threshold is a threshold corresponding to the sum of the throughput of the first tunnel and the throughput of the second tunnel.

With reference to the foregoing possible implementations of the first aspect, in a sixteenth possible implementation of the first aspect, determining, by the HAAP, that the status of the first tunnel and the status of the second tunnel meet the backoff condition includes, if the sum of the throughput of the first tunnel and the throughput of the second tunnel is less than the third threshold, determining, by the HAAP, that the status of the first tunnel and the status of the second tunnel meet the backoff condition.

With reference to the foregoing possible implementation of the first aspect, in a seventeenth possible implementation of the first aspect, determining, by the HAAP, that the status of the first tunnel and the status of the second tunnel do not meet the backoff condition includes, if the sum of the throughput of the first tunnel and the throughput of the second tunnel is greater than or equal to the third threshold and is less than or equal to a second threshold, determining, by the HAAP, that the status of the first tunnel and the status of the second tunnel do not meet the backoff condition, where the second threshold is greater than the third threshold.

With reference to the foregoing possible implementations of the first aspect, in an eighteenth possible implementation of the first aspect, after transmitting the user traffic using the first tunnel and the second tunnel, the method further includes determining, by the HAAP, whether the status of the first tunnel and the status of the second tunnel meet an exit condition, and after the HAAP determines that the status of the first tunnel and the status of the second tunnel meet the exit condition, transmitting, by the HAAP, the user traffic using the first tunnel, and determining whether the first tunnel is congested.

Optionally, before determining, by the HAAP, whether the status of the first tunnel and the status of the second tunnel meet an exit condition, the method further includes obtaining, by the HAAP, the status of the first tunnel and the status of the second tunnel in a process of transmitting the user traffic using the first tunnel and the second tunnel.

In the eighteenth possible implementation of the first aspect, the status of the first tunnel is a status of the first tunnel after second tunnel-based offloading, and the status of the second tunnel is a status of the second tunnel after second tunnel-based offloading.

Further, after the HAAP determines, according to the statuses when the probe traffic is transmitted using the second tunnel, that the status of the first tunnel and the status of the second tunnel meet the offloading condition, and transmits the user traffic by means of offloading using the first tunnel and the second tunnel, the HAAP may detect the status of the first tunnel and the status of the second tunnel in a current case. Because a tunnel status is unstable, a delay difference between the two tunnels may be excessively large or link quality of one of the two tunnels may be poor in a transmission process. Therefore, in an offloading transmission process, the status of the first tunnel and the status of the second tunnel may be monitored in real time. If the status of the first tunnel and the status of the second tunnel meet the exit condition, the HAAP may not use the second tunnel to transmit the user traffic but use only the first tunnel to transmit the user traffic, and detect, in real time, whether the first tunnel is congested.

With reference to the foregoing possible implementations of the first aspect, in a nineteenth possible implementation of the first aspect, the status of the first tunnel includes the throughput of the first tunnel and the delay of the first tunnel, the status of the second tunnel includes the throughput of the second tunnel and the delay of the second tunnel, and the exit condition is a fifth threshold and a sixth threshold, and determining, by the HAAP, that the status of the first tunnel and the status of the second tunnel meet the exit condition includes, if the sum of the throughput of the first tunnel and the throughput of the second tunnel is less than or equal to the fifth threshold, and the difference between the delay of the second tunnel and the delay of the first tunnel is greater than the sixth threshold, determining, by the HAAP, that the status of the first tunnel and the status of the second tunnel meet the exit condition.

It should be understood that the fifth threshold and the third threshold may be the same, or may be different, the sixth threshold and the fourth threshold may be the same, or may be different. This is not limited in the embodiments of the present disclosure.

It should be further understood that, when determining whether the status of the first tunnel and the status of the second tunnel meet the exit condition, the HAAP may use the throughputs as a prior determining condition. When the throughputs do not meet the exit condition, the HAAP uses the delay difference as a secondary determining condition. Optionally, the HAAP may use the delay difference as a prior determining condition. When the delay difference does not meet the exit condition, the HAAP uses the throughputs as a secondary determining condition. Alternatively, the HAAP may perform determining only according to a prior determining condition without considering a secondary determining condition. This is not limited in the embodiments of the present disclosure.

With reference to the foregoing possible implementations of the first aspect, in a twentieth possible implementation of the first aspect, obtaining a status of the first tunnel and the status of the second tunnel in the second state includes receiving, by the HAAP, a Generic Routing Encapsulation (GRE) packet sent by an HG, and determining, by the HAAP, the status of the first tunnel and the status of the second tunnel according to the GRE packet.

Further, the HAAP may measure a throughput, a packet loss rate, and a delay of a tunnel by sending the GRE packet. The HAAP may send the GRE packet to the HG. After filling a parameter into the GRE packet, the HG sends the GRE packet to the HAAP. The HAAP determines the status of the first tunnel and the status of the second tunnel according to the parameter in the GRE packet.

According to a second aspect, a traffic distribution apparatus in a hybrid access network is provided, and is configured to perform the method in the first aspect or any possible implementation of the first aspect.

Further, the apparatus includes units configured to perform the method in the first aspect or any possible implementation of the first aspect.

According to a third aspect, a traffic distribution apparatus in a hybrid access network is provided, and the apparatus includes a communications interface, a memory, a processor, and a communications bus. The communications interface, the memory, and the processor are connected using the communications bus. The memory is configured to store an instruction. The processor reads the instruction stored in the memory, to perform the method in the first aspect or any possible implementation of the first aspect.

According to a fourth aspect, a traffic distribution system in a hybrid access network is provided, and the system includes a home gateway and the apparatus in the second aspect, or the system includes a home gateway and the apparatus in the third aspect.

According to a fifth aspect, a computer readable medium is provided, and is configured to store a computer program, where the computer program includes an instruction used to perform the method in the first aspect or any possible implementation of the first aspect.

DESCRIPTION OF EMBODIMENTS

The following clearly describes the technical solutions in some of the embodiments of the present disclosure with reference to the accompanying drawings in some of the embodiments of the present disclosure. The described embodiments are some rather than all of the embodiments of the present disclosure.

Figure 1:
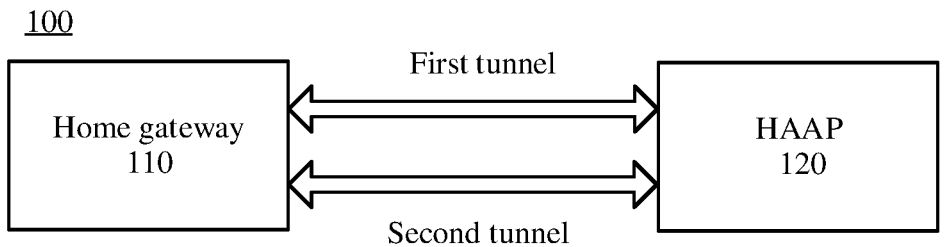
FIG. 1 is a schematic diagram of a hybrid access network.

FIG. 1 is a schematic diagram of a hybrid access network 100. The network 100 may include a home gateway 110 and an HAAP 120. To increase a network bandwidth, a first tunnel and a second tunnel may be established between the home gateway 110 and the HAAP 120 to transmit user service traffic in a hybrid manner.

Further, the home gateway 110 may send a request packet to the HAAP 120. The request packet is used to request to establish a tunnel. After receiving the request packet, the HAAP 120 may respond to the request of the home gateway 110, obtain an address of the first tunnel and an address of the second tunnel that are required when the tunnels between the HAAP 120 and the home gateway 110 are established, and separately perform authentication and authorization on the address of the first tunnel and the address of the second tunnel. After the authentication and authorization succeed, the HAAP 120 establishes the first tunnel and the second tunnel, and allocates a service address to the home gateway 110. Afterwards, when accessing the HAAP 120 according to the service address, the home gateway 110 may transmit the user service traffic in a hybrid manner using the first tunnel and the second tunnel.

When transmitting uplink service traffic of a user, the home gateway 110 may monitor an uplink bandwidth of high-priority service traffic, and calculate an available uplink bandwidth of the first tunnel such that the uplink service traffic of the user preferentially passes through the first tunnel, and uplink service traffic of a remaining uplink bandwidth in the uplink bandwidth other than the available uplink bandwidth passes through the second tunnel. Likewise, when transmitting downlink service traffic of a user, the home gateway 110 may monitor a downlink bandwidth of high-priority service traffic, calculate an available downlink bandwidth of the first tunnel, and send, to the HAAP 120, a notification packet carrying the available downlink bandwidth. After the HAAP 120 receives the available downlink bandwidth, the downlink service traffic of the user preferentially passes through the first tunnel, and downlink service traffic of a remaining downlink bandwidth in the downlink bandwidth other than the available downlink bandwidth passes through the second tunnel.

It should be understood that a plurality of other tunnels may be further established between the home gateway 110 and the HAAP 120. This is not limited in this embodiment of the present disclosure. It should be further understood that the first tunnel may be a DSL tunnel, and the second tunnel may be an LTE tunnel. A scenario of hybrid access by means of a DSL and LTE is merely used as an example for description in this specification. However, this embodiment of the present disclosure is not limited thereto.

From a perspective of a service, user services may be classified into two types. One type is a common Internet access service such as File Transfer Protocol (FTP) download, and the other type is a high-priority service such as an interactive personality television (IPTV), a Video On Demand (VOD) technology, or the Voice over Internet Protocol (VOIP). High-priority services of this type are collectively referred to as a bypass service. A DSL tunnel and an LTE tunnel are used as an example. The bypass service has a high priority, and passes through only an original DSL link and does not pass through a tunnel. Therefore, the high-priority service occupies a bandwidth of the DSL link, and the DSL tunnel occupies a remaining bandwidth. For the common Internet access service, service traffic of the common Internet access service is preferentially transmitted using the DSL tunnel, and is offloaded to the LTE tunnel when a bandwidth of the DSL tunnel is inadequate.

After the LTE tunnel and the DSL tunnel are successfully established between the HG and the HAAP, dual-tunnel bonding is automatically enabled by default and the user service traffic is offloaded in a packet-based manner. In an offloading process, because the user service traffic is forwarded in a packet-based manner, a sequence preserving mechanism is used to overcome a problem that packets are out of order at a peer device because of a delay difference between the LTE tunnel and the DSL tunnel. A sequence number is added to a GRE header of each packet such that after receiving the packet, the peer device uses the sequence number to restore a sequence of packets that are out of order after being offloaded in a packet-based manner.

However, when the delay difference between the LTE tunnel and the DSL tunnel is excessively large, the peer device is always in a wait state after receiving a forwarded packet, or directly sends out-of-order packets after a sequence preserving delay is exceeded. In this way, a system throughput fluctuates back and forth, and consequently, a dual-tunnel bandwidth is lower than a single-tunnel bandwidth.

To resolve the problem that the dual-tunnel bandwidth is lower than the single-tunnel bandwidth, the embodiments of the present disclosure propose a new dual-tunnel traffic distribution method in a hybrid access network in order to increase a bandwidth, that is, avoid the problem that the dual-tunnel bandwidth is lower than the single-tunnel bandwidth. In the method, after determining that a first tunnel is congested when user traffic is transmitted over the first tunnel, an HAAP transmits probe traffic using a second tunnel. The probe traffic is traffic, in the user traffic, used to obtain a status of the second tunnel. The HAAP obtains a status of the first tunnel and the status of the second tunnel. The HAAP determines, according to the status of the first tunnel and the status of the second tunnel, whether the status of the first tunnel and the status of the second tunnel meet an offloading condition. After determining that the status of the first tunnel and the status of the second tunnel meet the offloading condition, the HAAP transmits the user traffic using the first tunnel and the second tunnel.

Figure 2:
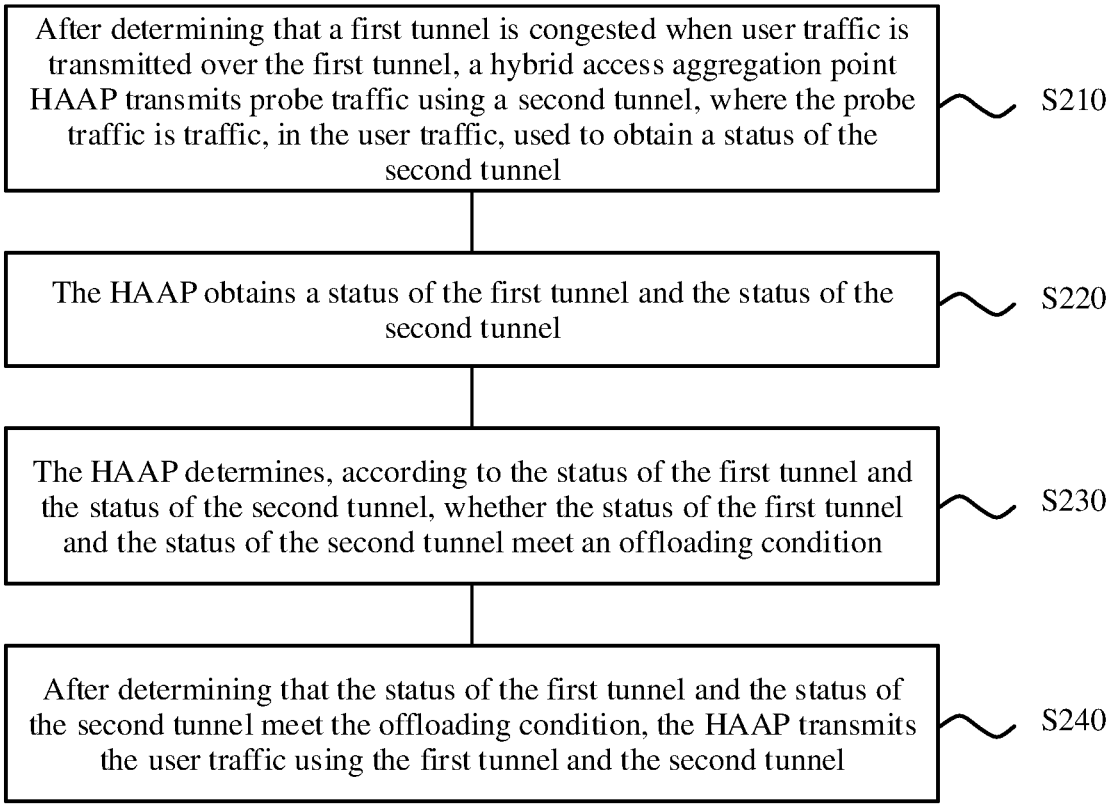
FIG. 2 is a flowchart of a traffic distribution method in a hybrid access network according to an embodiment of the present disclosure.

FIG. 2 is a flowchart of a traffic distribution method 200 in a hybrid access network according to an embodiment of the present disclosure. The method 200 may be applied to the network 100 shown in FIG. 1. However, this embodiment of the present disclosure is not limited thereto. The method 200 includes the following steps.

Step S210. After determining that a first tunnel is congested when user traffic is transmitted over the first tunnel, an HAAP transmits probe traffic using a second tunnel, where the probe traffic is traffic, in the user traffic, used to obtain a status of the second tunnel.

Further, after the first tunnel and the second tunnel are established between the HAAP and an HG, the HAAP preferentially transmits user service traffic using the first tunnel, and monitors a status of the first tunnel in real time. If the first tunnel is congested, the HAAP offloads, to the second tunnel, a part of traffic on the first tunnel, that is, the probe traffic. The second tunnel is used to transmit the part of traffic such that the HAAP determines, according to the status of the second tunnel during transmission, whether traffic on the first tunnel can be offloaded to the second tunnel.

It should be understood that at a stage of probing the second tunnel, the HAAP allocates traffic with a specific proportion to the second tunnel, and remaining traffic is still transmitted in a common offloading manner, that is, first passes through the first tunnel, and is offloaded to the second tunnel when a bandwidth of the first tunnel is inadequate. For example, if the user traffic is 10 MB, and the bandwidth of the first tunnel is 5 MB, the HAAP first forcibly allocates 1-M traffic for second tunnel-based transmission, and enters the probing stage. At the probing stage, the HAAP obtains a status of the first tunnel when 5-M traffic is transmitted over the first tunnel and a status of the second tunnel when the 1-M traffic is transmitted over the second tunnel. If the HAAP determines that the status of the first tunnel and the status of the second tunnel meet an offloading condition at the probing stage, the HAAP may transmit 4-M traffic in the 10-M traffic according to a preset policy using the second tunnel. Therefore, if link quality of the second tunnel is good enough, a sum of a throughput of the first tunnel and a throughput of the second tunnel can be kept 10 MB. If link quality of the second tunnel is relatively poor, the user traffic sharply decreases after the second tunnel is used for transmission. The HAAP determines that the status of the first tunnel and the status of the second tunnel do not meet the offloading condition at the probing stage, and temporarily does not use the second tunnel to transmit the user traffic.

In an optional embodiment, before determining, by an HAAP, that a first tunnel is congested when user traffic is transmitted over the first tunnel, the method further includes determining, by the HAAP according to a link quality parameter of the first tunnel and a first threshold, whether the first tunnel is congested.

The HAAP may determine, in a plurality of manners, whether the first tunnel is congested when the user traffic is transmitted over the first tunnel. In an optional embodiment, determining, by an HAAP, that a first tunnel is congested when user traffic is transmitted over the first tunnel includes, if the link quality parameter of the first tunnel is greater than the first threshold, determining, by the HAAP, that the first tunnel is congested.

In an optional embodiment, the link quality parameter of the first tunnel is a packet loss rate of the first tunnel, and the first threshold is a threshold corresponding to the packet loss rate. Alternatively, the link quality parameter of the first tunnel is a throughput of the first tunnel, and the first threshold is a threshold corresponding to the throughput. Alternatively, the link quality parameter of the first tunnel includes a packet loss rate of the first tunnel and a throughput of the first tunnel. The first threshold includes a first subthreshold and a second subthreshold, the first subthreshold is a threshold corresponding to the packet loss rate, and the second subthreshold is a threshold corresponding to the throughput.

In an optional embodiment, determining, by an HAAP, that a first tunnel is congested when user traffic is transmitted over the first tunnel includes determining, by the HAAP, whether the throughput of the first tunnel is greater than the first threshold, and if the throughput of the first tunnel is greater than the first threshold, determining, by the HAAP, that the first tunnel is congested.

In an optional embodiment, the method further includes, if the throughput of the first tunnel is less than or equal to the first threshold, determining, by the HAAP, whether the packet loss rate of the first tunnel is greater than a packet loss rate threshold, and if the packet loss rate of the first tunnel is greater than the packet loss rate threshold, determining, by the HAAP, that the first tunnel is congested.

Further, the HAAP may determine a current status of the first tunnel according to the throughput and/or the packet loss rate of the first tunnel, and determine whether the first tunnel is congested when the user service traffic is transmitted using only the first tunnel.

Step S220. The HAAP obtains a status of the first tunnel and the status of the second tunnel.

Further, after the HAAP offloads the probe traffic to the second tunnel, the HAAP obtains the status of the first tunnel and the status of the second tunnel.

The HAAP may obtain the status of the first tunnel and the status of the second tunnel in a plurality of manners. In an optional embodiment, the obtaining, by the HAAP, a status of the first tunnel and the status of the second tunnel includes receiving, by the HAAP, a GRE packet sent by the HG, and determining, by the HAAP, the status of the first tunnel and the status of the second tunnel according to the GRE packet.

Further, the HAAP may send the GRE packet to the HG, and determine the statuses of the first tunnel and the second tunnel using the GRE packet. After receiving the GRE packet, the HG fills a related link quality parameter into the GRE packet, and then returns the GRE packet to the HAAP. In this way, the HAAP receives the GRE packet returned by the HG, and can obtain the status of the first tunnel and the status of the second tunnel according to the link quality parameter carried in the GRE packet.

In this embodiment of the present disclosure, the HAAP may periodically monitor the status of the first tunnel and the status of the second tunnel. The status of the first tunnel and the status of the second tunnel in S220 are a status of the first tunnel and a status of the second tunnel that are obtained after the HAAP transmits the probe traffic using the second tunnel.

Step S230. The HAAP determines, according to the status of the first tunnel and the status of the second tunnel, whether the status of the first tunnel and the status of the second tunnel meet an offloading condition.

Further, the HAAP may determine, according to the status of the first tunnel and the status of the second tunnel, whether an overall bandwidth of the first tunnel and the second tunnel is higher than a bandwidth after the probe traffic is offloaded to the second tunnel, where the bandwidth is used for transmitting the traffic using only the first tunnel in order to determine whether to offload the user traffic.

The HAAP may determine, in a plurality of manners, whether to perform offloading. Further, the HAAP may use the throughputs as the offloading condition for determining. However, this embodiment of the present disclosure is not limited thereto.

In an optional embodiment, determining whether the status of the first tunnel and the status of the second tunnel meet an offloading condition includes determining, by the HAAP, whether a sum of a throughput of the first tunnel and a throughput of the second tunnel is greater than a second threshold. The second threshold is a threshold corresponding to the sum of the throughput of the first tunnel and the throughput of the second tunnel.

In an optional embodiment, the status of the second tunnel includes a delay of the second tunnel, and the status of the first tunnel includes a delay of the first tunnel. Determining, by the HAAP according to the status of the first tunnel and the status of the second tunnel, whether the status of the first tunnel and the status of the second tunnel meet an offloading condition includes determining, by the HAAP, whether a difference between the delay of the second tunnel and the delay of the first tunnel is less than a fourth threshold. The fourth threshold is a threshold corresponding to the difference between the delay of the second tunnel and the delay of the first tunnel.

Step S240. After determining that the status of the first tunnel and the status of the second tunnel meet the offloading condition, the HAAP transmits the user traffic using the first tunnel and the second tunnel.

The HAAP determines that the status of the first tunnel and the status of the second tunnel meet the offloading condition. This means that a bandwidth can be increased by transmitting the user traffic in a hybrid manner using the first tunnel and the second tunnel. Therefore, the HAAP may offload traffic that causes the first tunnel to be congested to the second tunnel, and transmit the user traffic using the first tunnel and the second tunnel.

If the throughputs are used as the offloading condition for determining, that is, the second threshold is the threshold corresponding to the throughput sum, in an optional embodiment, the determining, by the HAAP, that the status of the first tunnel and the status of the second tunnel meet the offloading condition includes, if the sum of the throughput of the first tunnel and the throughput of the second tunnel is greater than the second threshold, determining, by the HAAP, that the status of the first tunnel and the status of the second tunnel meet the offloading condition.

If the delay difference is used as the offloading condition for determining, that is, the fourth threshold is the threshold corresponding to the delay difference, in another optional embodiment, determining, by the HAAP, that the status of the first tunnel and the status of the second tunnel meet the offloading condition includes, if the difference between the delay of the second tunnel and the delay of the first tunnel is less than the fourth threshold, determining, by the HAAP, that the status of the first tunnel and the status of the second tunnel meet the offloading condition.

In the traffic distribution method in a hybrid access network in this embodiment of the present disclosure, after detecting that the first tunnel is congested, the HAAP transmits the probe traffic using the second tunnel to probe the status of the second tunnel. At the stage of transmitting the probe traffic using the second tunnel, after determining that the status of the first tunnel and the status of the second tunnel meet the offloading condition, the HAAP transmits the user traffic in a hybrid manner using the first tunnel and the second tunnel. In this way, the HAAP probes the status of the second tunnel before performing offloading such that a case in which an overall bandwidth for dual tunnel-based traffic transmission is lower than a bandwidth for single tunnel-based traffic transmission can be avoided, thereby improving user experience.

In an optional embodiment, the method further includes, after determining that the status of the first tunnel and the status of the second tunnel do not meet the offloading condition, determining, by the HAAP, whether the status of the first tunnel and the status of the second tunnel meet a backoff condition, and after the HAAP determines that the status of the first tunnel and the status of the second tunnel meet the backoff condition, determining, by the HAAP, whether the first tunnel is congested.

Optionally, the method further includes, after the HAAP determines that the status of the first tunnel and the status of the second tunnel do not meet the backoff condition, transmitting, by the HAAP, the user traffic using the first tunnel, and skipping performing congestion determining on the first tunnel within preset duration. The preset duration may be referred to as penalty duration. The penalty duration is used to indicate a time period of a penalty stage. The penalty duration may be set by the HAAP according to an actual case. For example, when a user enters the penalty stage for the first time, the HAAP may set the penalty duration to 30 s. If the user enters the penalty stage for the second time, the HAAP may prolong the penalty duration to 60 s, and so on. However, this is not limited in this embodiment of the present disclosure.

For example, the HAAP may skip performing congestion determining on the first tunnel within the preset duration using a timer, that is, the HAAP may set the timer, and after the timer expires, the HAAP determines whether the first tunnel is in a congested state.

Further, after determining that the status of the first tunnel and the status of the second tunnel do not meet the offloading condition when the HAAP transmits the probe traffic using the second tunnel, the HAAP may further determine whether the status of the first tunnel and the status of the second tunnel meet the backoff condition. The backoff condition is used to indicate whether the HAAP is allowed to return to a status in which the HAAP transmits the user traffic using only the first tunnel and monitors, in real time, whether the first tunnel is congested. If the status of the first tunnel and the status of the second tunnel meet the backoff condition, the HAAP may transmit the user traffic using only the first tunnel, and detect, in real time, whether the first tunnel is congested. If the status of the first tunnel and the status of the second tunnel do not meet the backoff condition, the HAAP may transmit the user traffic using only the first tunnel, but may not detect, within the preset duration, whether the first tunnel is congested.

In addition, the HAAP may determine, in a plurality of manners, whether the status of the first tunnel and the status of the second tunnel meet the backoff condition.

In an optional embodiment, the status of the second tunnel further includes a delay of the second tunnel, and the status of the first tunnel further includes a delay of the first tunnel. Determining whether the status of the first tunnel and the status of the second tunnel meet a backoff condition includes determining, by the HAAP, whether a difference between the delay of the second tunnel and the delay of the first tunnel is less than a fourth threshold. The fourth threshold is a threshold corresponding to the difference between the delay of the second tunnel and the delay of the first tunnel. If the difference between the delay of the second tunnel and the delay of the first tunnel is less than the fourth threshold, the HAAP determines that the status of the first tunnel and the status of the second tunnel meet the backoff condition.

In an optional embodiment, the status of the second tunnel includes the throughput of the second tunnel, and the status of the first tunnel includes the throughput of the first tunnel. Determining whether the status of the first tunnel and the status of the second tunnel meet a backoff condition includes determining, by the HAAP, whether the sum of the throughput of the first tunnel and the throughput of the second tunnel is less than a third threshold. The third threshold is a threshold corresponding to the sum of the throughput of the first tunnel and the throughput of the second tunnel. If the sum of the throughput of the first tunnel and the throughput of the second tunnel is less than the third threshold, the HAAP determines that the status of the first tunnel and the status of the second tunnel meet the backoff condition. The third threshold is less than the second threshold.

In an optional embodiment, the method further includes, if the sum of the throughput of the first tunnel and the throughput of the second tunnel is greater than or equal to the third threshold, determining, by the HAAP, whether the difference between the delay of the first tunnel and the delay of the second tunnel is less than the fourth threshold, and if the difference between the delay of the first tunnel and the delay of the second tunnel is less than the fourth threshold, determining, by the HAAP, that the status of the first tunnel and the status of the second tunnel meet the backoff condition.

In an optional embodiment, determining, by the HAAP, that the status of the first tunnel and the status of the second tunnel do not meet the backoff condition includes, if the sum of the throughput of the first tunnel and the throughput of the second tunnel is greater than or equal to the third threshold, and the difference between the delay of the first tunnel and the delay of the second tunnel is greater than or equal to the fourth threshold, determining, by the HAAP, that the status of the first tunnel and the status of the second tunnel do not meet the backoff condition.

In this way, the HAAP may determine, according to the throughputs and/or the delay difference, whether the status of the first tunnel and the status of the second tunnel meet the offloading condition or the backoff condition at the probing stage in order to correspondingly adjust a current traffic transmission status.

In an optional embodiment, after the user traffic is transmitted using the first tunnel and the second tunnel, the method further includes determining, by the HAAP, whether the status of the first tunnel and the status of the second tunnel meet an exit condition, and after the HAAP determines that the status of the first tunnel and the status of the second tunnel meet the exit condition, transmitting, by the HAAP, the user traffic using the first tunnel, and determining whether the first tunnel is congested.

Further, after the HAAP has successfully performed offloading, the HAAP transmits the user traffic in a hybrid manner using the first tunnel and the second tunnel. However, because a tunnel status is unstable, a delay difference between the two tunnels may be excessively large or link quality of one of the two tunnels may be poor in a transmission process. Therefore, in an offloading transmission process, the status of the first tunnel and the status of the second tunnel may be monitored in real time. If the status of the first tunnel and the status of the second tunnel meet the exit condition, the HAAP may not use the second tunnel to transmit the user traffic but use only the first tunnel to transmit the user traffic.

The HAAP may determine, in a plurality of manners, whether the status of the first tunnel and the status of the second tunnel meet the exit condition. In an optional embodiment, determining whether the status of the first tunnel and the status of the second tunnel meet an exit condition includes determining, by the HAAP, whether the sum of the throughput of the first tunnel and the throughput of the second tunnel is greater than a fifth threshold. Correspondingly, determining, by the HAAP, that the status of the first tunnel and the status of the second tunnel meet the exit condition includes, if the sum of the throughput of the first tunnel and the throughput of the second tunnel is less than or equal to the fifth threshold, determining, by the HAAP, that the status of the first tunnel and the status of the second tunnel meet the exit condition.

In an optional embodiment, determining whether the status of the first tunnel and the status of the second tunnel meet an exit condition includes, if the sum of the throughput of the first tunnel and the throughput of the second tunnel is less than or equal to the fifth threshold, determining whether the difference between the delay of the first tunnel and the delay of the second tunnel is greater than a sixth threshold. Correspondingly, determining, by the HAAP, that the status of the first tunnel and the status of the second tunnel meet the exit condition includes, if the sum of the throughput of the first tunnel and the throughput of the second tunnel is less than or equal to the fifth threshold, and the difference between the delay of the first tunnel and the delay of the second tunnel is greater than the sixth threshold, determining, by the HAAP, that the status of the first tunnel and the status of the second tunnel meet the exit condition.

In this way, in a normal offloading process, the HAAP may determine, according to the throughputs and/or the delay difference, whether the HAAP needs to exit an offloading mode, that is, not to use the second tunnel for offloading, but use only the first tunnel to transmit the user traffic. Therefore, the HAAP can adjust a user traffic transmission status in real time according to a current case in order to improve user experience.

The fifth threshold and the third threshold may be the same, or may be different. The sixth threshold and the fourth threshold may be the same, or may be different. This is not limited in this embodiment of the present disclosure.

It should be further understood that the HAAP may use the sum of the throughputs of the two tunnels as an exit determining condition, or may use the sum of the throughputs of the two tunnels and the difference between the delays of the two tunnels as an exit determining condition. This is not limited in this embodiment of the present disclosure.

Optionally, the HAAP may set a detection period and a quantity of exit times, and the HAAP records a quantity of times that the exit condition is met. When the quantity of times that the exit condition is met reaches the quantity of exit times, the HAAP may not use the second tunnel for offloading, but use only the first tunnel to transmit the user traffic. Congestion determining, offloading determining, backoff determining, and the like in this embodiment of the present disclosure may be limited in terms of a quantity of times in a specific implementation process. This is not limited in this embodiment of the present disclosure.

Figure 3:
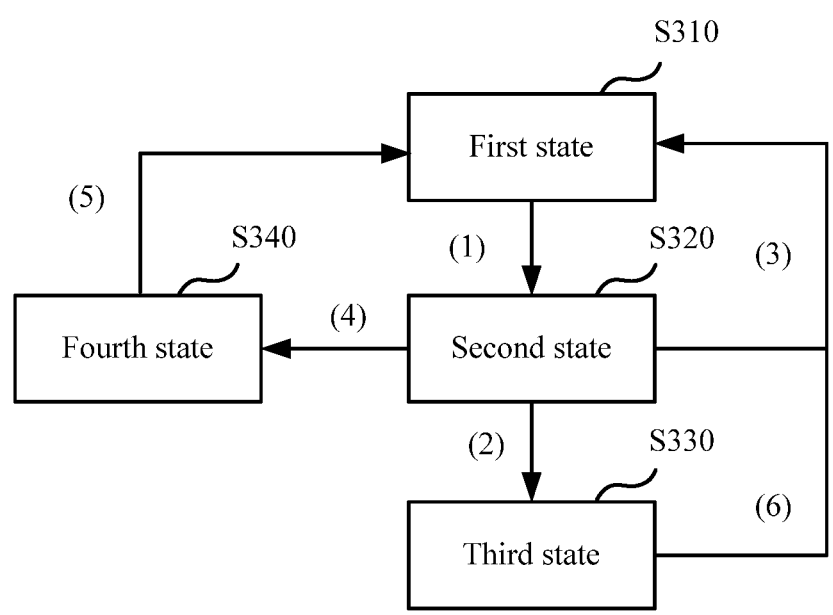
FIG. 3 is a schematic diagram of status switching in a traffic distribution method in a hybrid access network according to an embodiment of the present disclosure.

FIG. 3 is a schematic diagram of status switching in a traffic distribution method in a hybrid access network according to an embodiment of the present disclosure.

S310. An HAAP sets a traffic transmission status of user service traffic to a first state, and in the first state, the HAAP transmits the user traffic using only a first tunnel, and when transmitting the traffic, detects whether the first tunnel is congested.

S320. The HAAP sets the traffic transmission status of the user service traffic to a second state, and in the second state, the HAAP transmits the user traffic using the first tunnel and a second tunnel, and adds probe traffic to the second tunnel, where the probe traffic is traffic, in the user traffic, used to obtain a status of the second tunnel.

S330. The HAAP sets the traffic transmission status of the user service traffic to a third state, and in the third state, the HAAP transmits the user traffic in a common packet-based offloading manner, that is, transmits the user traffic in a hybrid manner using the first tunnel and the second tunnel.

S340. The HAAP sets the traffic transmission status of the user service traffic to a fourth state, and in the fourth state, the HAAP transmits the user traffic using only the first tunnel, but does not perform congestion detection on the first tunnel.

Further, a state machine may run on the HAAP. The traffic transmission status of the user service traffic between the HAAP and an HG may be switched between a plurality of statuses. A rule of status switching between the foregoing four statuses is described in detail below with reference to FIG. 3.

(1) The traffic transmission status is switched from S310 to S320: When the HAAP transmits the user traffic using the first tunnel, if the HAAP detects that the first tunnel is congested, the HAAP transmits the probe traffic using the second tunnel, that is, switches the traffic transmission status from S310 to S320. The probe traffic is used to obtain the status of the second tunnel such that the HAAP determines whether the user traffic can be offloaded to the second tunnel.

(2) The traffic transmission status is switched from S320 to S330: If determining that a status of the first tunnel and the status of the second tunnel meet the foregoing offloading condition, the HAAP switches the traffic transmission status from S320 to S330, that is, transmits the user traffic in the common packet-based offloading mode using the first tunnel and the second tunnel.

(3) The traffic transmission status is switched from S320 to S310: If determining that the status of the first tunnel and the status of the second tunnel do not meet the foregoing offloading condition but meet the foregoing backoff condition, the HAAP switches the traffic transmission status from S320 back to S310.

(4) The traffic transmission status is switched from S320 to S340: If determining that the status of the first tunnel and the status of the second tunnel meet neither the foregoing offloading condition nor the foregoing backoff condition, the HAAP switches the traffic transmission status from S320 to S340.

(5) The traffic transmission status is switched from S340 to S310: The HAAP keeps in the fourth state as the traffic transmission status within a first time period, and directly switches the traffic transmission status back to the first state after the first time period, that is, switches the traffic transmission status from S340 to S310 in order to transmit the user traffic using the first tunnel, and monitor, in real time, whether the first tunnel is congested.

(6) The traffic transmission status is switched from S330 to S310: In the third state, that is, when the user traffic is transmitted in a hybrid manner using the first tunnel and the second tunnel, a throughput may be inadequate or link quality may be poor. Therefore, the HAAP needs to obtain a status of the first tunnel and a status of the second tunnel in this state, and determine whether the status of the first tunnel and the status of the second tunnel meet an exit condition. If the status of the first tunnel and the status of the second tunnel meet the exit condition, the HAAP does not use the second tunnel to transmit the traffic, but switches the traffic transmission status from S330 back to S310 and uses only the first tunnel to transmit the user traffic.

In this way, the four traffic transmission statuses may be mutually switched according to a current status of the first tunnel and/or a current status of the second tunnel in order to avoid a case in which an overall dual-tunnel bandwidth is lower than a single-tunnel bandwidth during dual-tunnel bonding, thereby improving user experience.

Figure 4:
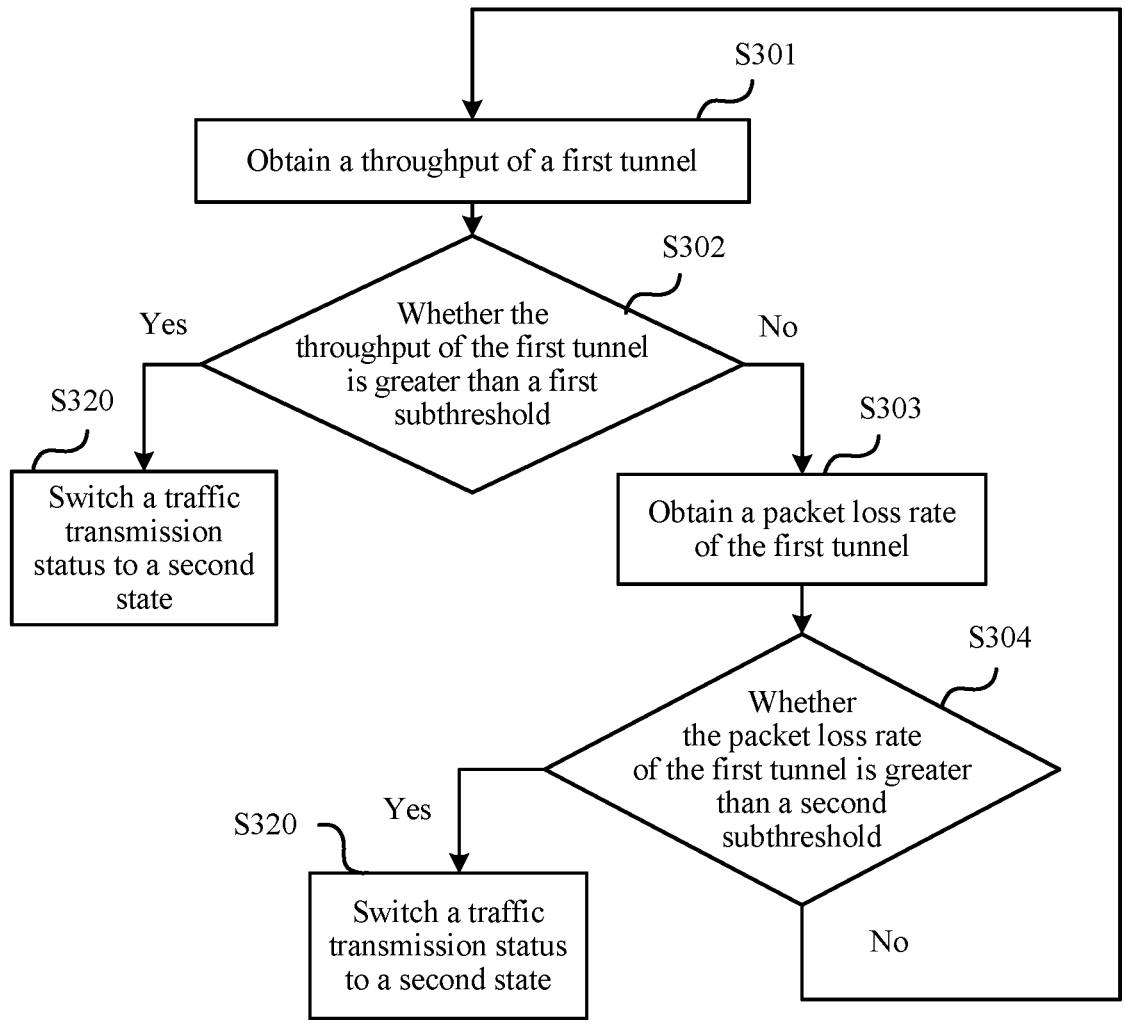
FIG. 4 is a schematic flowchart of a first state in a traffic distribution method according to an embodiment of the present disclosure.

FIG. 4 is a schematic flowchart of a first state in a traffic distribution method according to an embodiment of the present disclosure. The first state S310 includes content in S301 to S304.

S301. An HAAP obtains a throughput of a first tunnel in the first state.

S302. The HAAP determines whether the throughput of the first tunnel is greater than a first subthreshold.

If the throughput of the first tunnel is greater than the first subthreshold, the HAAP determines that the first tunnel is congested, and the HAAP performs S320, that is, switches the state machine from the first state S310 to the second state S320. The first subthreshold is a threshold corresponding to the throughput of the first tunnel, and may be used to determine whether the first tunnel is congested.

Optionally, the method further includes, if the throughput of the first tunnel is less than or equal to the first subthreshold, the HAAP performs S303, that is, obtains a packet loss rate of the first tunnel in the first state.

S304. The HAAP determines whether the packet loss rate of the first tunnel is greater than a second subthreshold.

If the packet loss rate of the first tunnel is greater than the second subthreshold, the HAAP determines that the first tunnel is congested, and the HAAP switches the state machine from the first state S310 to the second state S320.

If the packet loss rate of the first tunnel is less than or equal to the second subthreshold, the HAAP determines that the first tunnel is not congested, and performs S301. The HAAP may periodically detect the throughput of the first tunnel to determine whether the first tunnel is congested.

It should be understood that sequence numbers of the foregoing processes do not mean an execution sequence. The execution sequence of the processes should be determined according to functions and internal logic of the processes, and should not be construed as any limitation on the implementation processes of the embodiments of the present disclosure.

Figure 5:
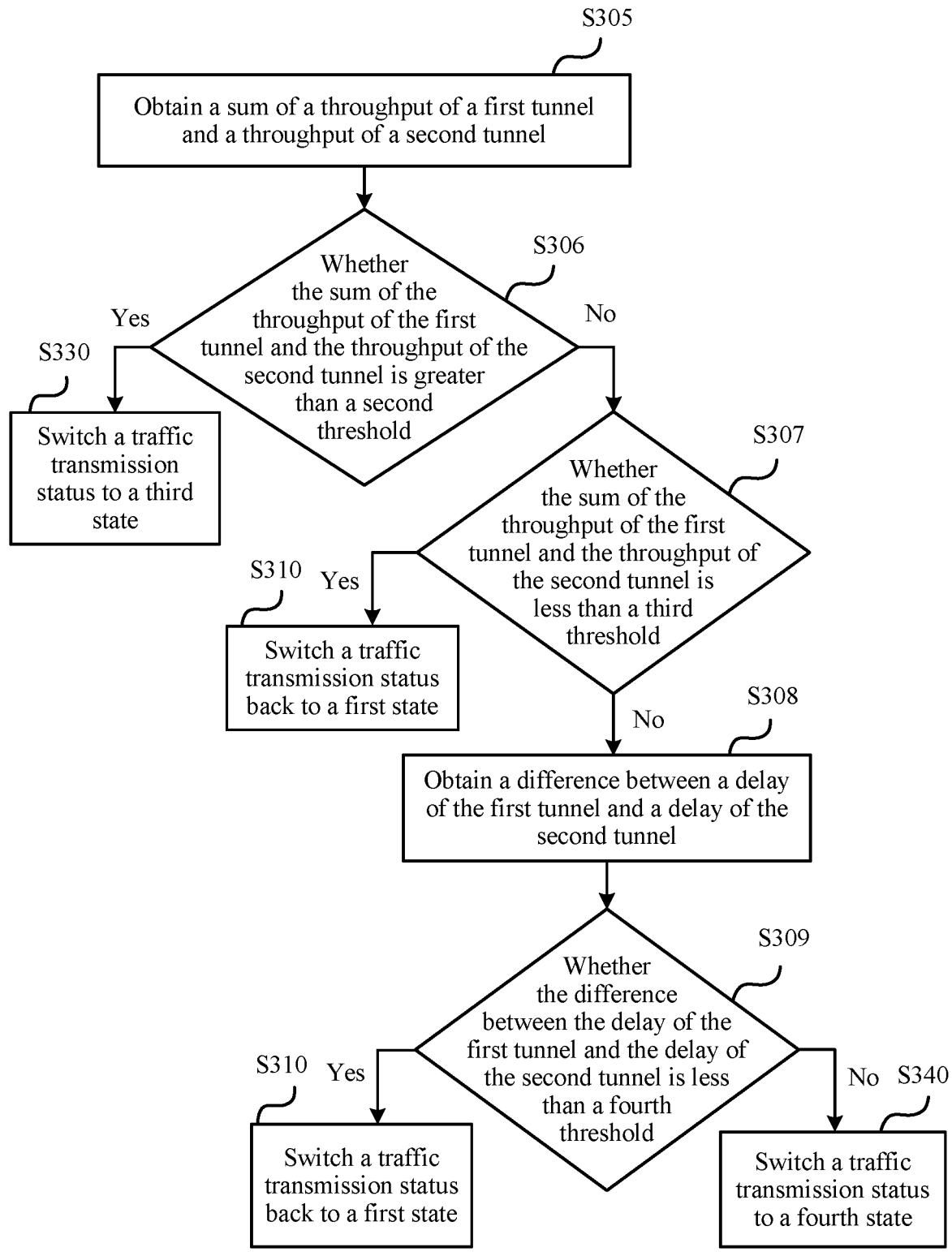
FIG. 5 is a schematic flowchart of a second state in a traffic distribution method according to an embodiment of the present disclosure.

FIG. 5 is a schematic flowchart of a second state in a traffic distribution method according to an embodiment of the present disclosure. The second state S320 includes content in S305 to S309.

S305. The HAAP obtains a sum of a throughput of the first tunnel and a throughput of a second tunnel in the second state.

S306. The HAAP determines whether the sum of the throughput of the first tunnel and the throughput of the second tunnel is greater than a second threshold.

If the sum of the throughput of the first tunnel and the throughput of the second tunnel is greater than the second threshold, the HAAP determines that current statuses of the first tunnel and the second tunnel meet an offloading condition, and the HAAP switches a traffic transmission status from the second state S320 to the third state S330, that is, performs corresponding (2) in FIG. 3.

If the sum of the throughput of the first tunnel and the throughput of the second tunnel is less than or equal to the second threshold, the HAAP performs S307.

S307. The HAAP determines whether the sum of the throughput of the first tunnel and the throughput of the second tunnel is less than a third threshold, where the second threshold is greater than the third threshold.

If the sum of the throughput of the first tunnel and the throughput of the second tunnel is less than the third threshold, the HAAP determines that current statuses of the first tunnel and the second tunnel meet a backoff condition, and the HAAP switches the traffic transmission status from the second state S320 back to the first state S310, that is, performs corresponding (3) in FIG. 3.

If the sum of the throughput of the first tunnel and the throughput of the second tunnel is greater than or equal to the third threshold, the HAAP performs S308.

S308. The HAAP obtains a difference between a delay of the first tunnel and a delay of the second tunnel, and then performs S309.

S309. The HAAP determines whether the difference between the delay of the first tunnel and the delay of the second tunnel is less than a fourth threshold.

If the delay difference between the first tunnel and the second tunnel is less than the fourth threshold, the HAAP determines that current statuses of the first tunnel and the second tunnel meet the backoff condition, and the HAAP switches the traffic transmission status from the second state S320 back to the first state S310, that is, performs corresponding (3) in FIG. 3.

If the difference between the delay of the first tunnel and the delay of the second tunnel is greater than or equal to the fourth threshold, it indicates that after the second tunnel is used, the delay difference between the first tunnel and the second tunnel is excessively large, and an overall throughput is lowered. Therefore, the HAAP switches the traffic transmission status from the second state S320 to the fourth state S340, that is, performs corresponding (4) in FIG. 3.

Optionally, the method further includes, after the first time period in which the fourth state S340 is kept as the traffic transmission status, the HAAP performs S310, that is, performs congestion determining according to the throughput of the first tunnel and/or the packet loss rate of the first tunnel.

It should be understood that, when the traffic transmission status is the second state, the HAAP may determine, in a plurality of manners, whether to perform status switching. For example, in FIG. 5, the HAAP uses the sum of the throughput of the first tunnel and the throughput of the second tunnel as a prior determining condition. When the sum of the throughput of the first tunnel and the throughput of the second tunnel meets neither the offloading condition nor the backoff condition, the HAAP uses the delay difference between the first tunnel and the second tunnel as a determining condition for further determining.

Figure 6:
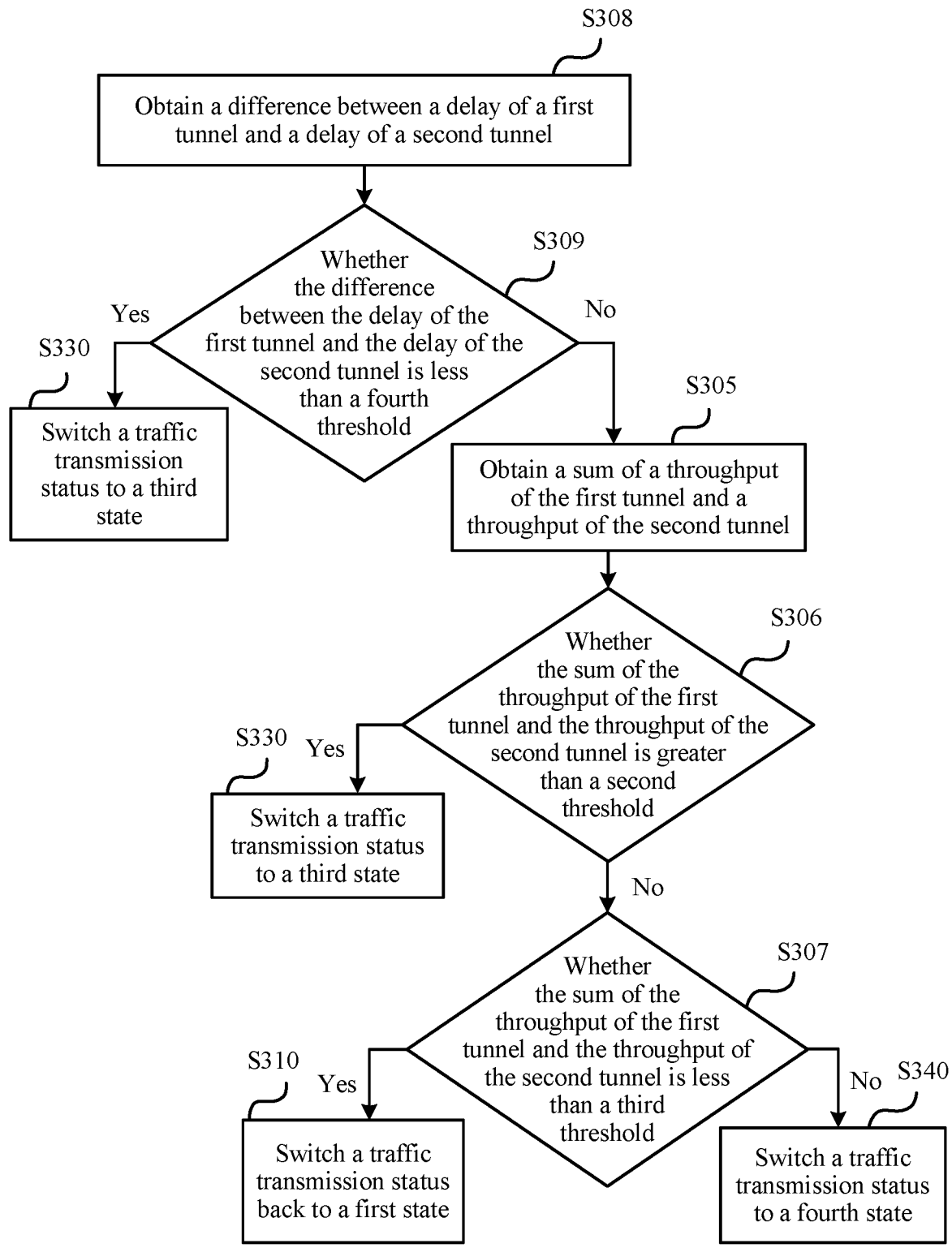
FIG. 6 is another schematic flowchart of a second state in a traffic distribution method according to an embodiment of the present disclosure.

Optionally, as shown in FIG. 6, the HAAP may use the difference between the delay of the first tunnel and the delay of the second tunnel as a prior determining condition. When the difference between the delay of the first tunnel and the delay of the second tunnel does not meet the offloading condition, the HAAP determines, according to the sum of the throughput of the first tunnel and the throughput of the second tunnel, whether the HAAP backs off to be in the first state or enters the fourth state.

S308. The HAAP obtains a difference between a delay of the first tunnel and a delay of the second tunnel in the second state.

S309. The HAAP determines whether the difference between the delay of the first tunnel and the delay of the second tunnel is less than a fourth threshold.

If the difference between the delay of the first tunnel and the delay of the second tunnel is less than the fourth threshold, the HAAP determines that current statuses of the first tunnel and the second tunnel meet the offloading condition, and the HAAP switches the traffic transmission status from the second state S320 to the third state S330, that is, performs corresponding (2) in FIG. 3.

If the difference between the delay of the first tunnel and the delay of the second tunnel is greater than or equal to the fourth threshold, it indicates that after the second tunnel is used, the difference between the delay of the first tunnel and the delay of the second tunnel is excessively large. In this case, the HAAP performs S305.

S305. The HAAP obtains a sum of a throughput of the first tunnel and a throughput of a second tunnel in the second state, and then performs S306.

S306. The HAAP determines whether the sum of the throughput of the first tunnel and the throughput of the second tunnel is greater than a second threshold.

If the sum of the throughput of the first tunnel and the throughput of the second tunnel is greater than the second threshold, the HAAP determines that current statuses of the first tunnel and the second tunnel meet the offloading condition, and the HAAP switches the traffic transmission status from the second state S320 to the third state S330, that is, performs corresponding (2) in FIG. 3.

If the sum of the throughput of the first tunnel and the throughput of the second tunnel is less than or equal to the second threshold, the HAAP performs S307.

S307. The HAAP determines whether the sum of the throughput of the first tunnel and the throughput of the second tunnel is less than a third threshold, where the second threshold is greater than the third threshold.

If the sum of the throughput of the first tunnel and the throughput of the second tunnel is less than the third threshold, the HAAP determines that current statuses of the first tunnel and the second tunnel meet the backoff condition, and the HAAP switches the traffic transmission status from the second state S320 back to the first state S310, that is, performs corresponding (3) in FIG. 3.

If the sum of the throughput of the first tunnel and the throughput of the second tunnel is greater than or equal to the third threshold, the HAAP switches the traffic transmission status from the second state S320 to the fourth state S340, that is, performs corresponding (4) in FIG. 3.

Optionally, after the first time period in which the fourth state is kept as the traffic transmission status, the HAAP switches the traffic transmission status back to the first state, that is, performs corresponding (5) in FIG. 3.

It should be understood that sequence numbers of the foregoing processes do not mean an execution sequence. The execution sequence of the processes should be determined according to functions and internal logic of the processes, and should not be construed as any limitation on the implementation processes of the embodiments of the present disclosure.

Figure 7:
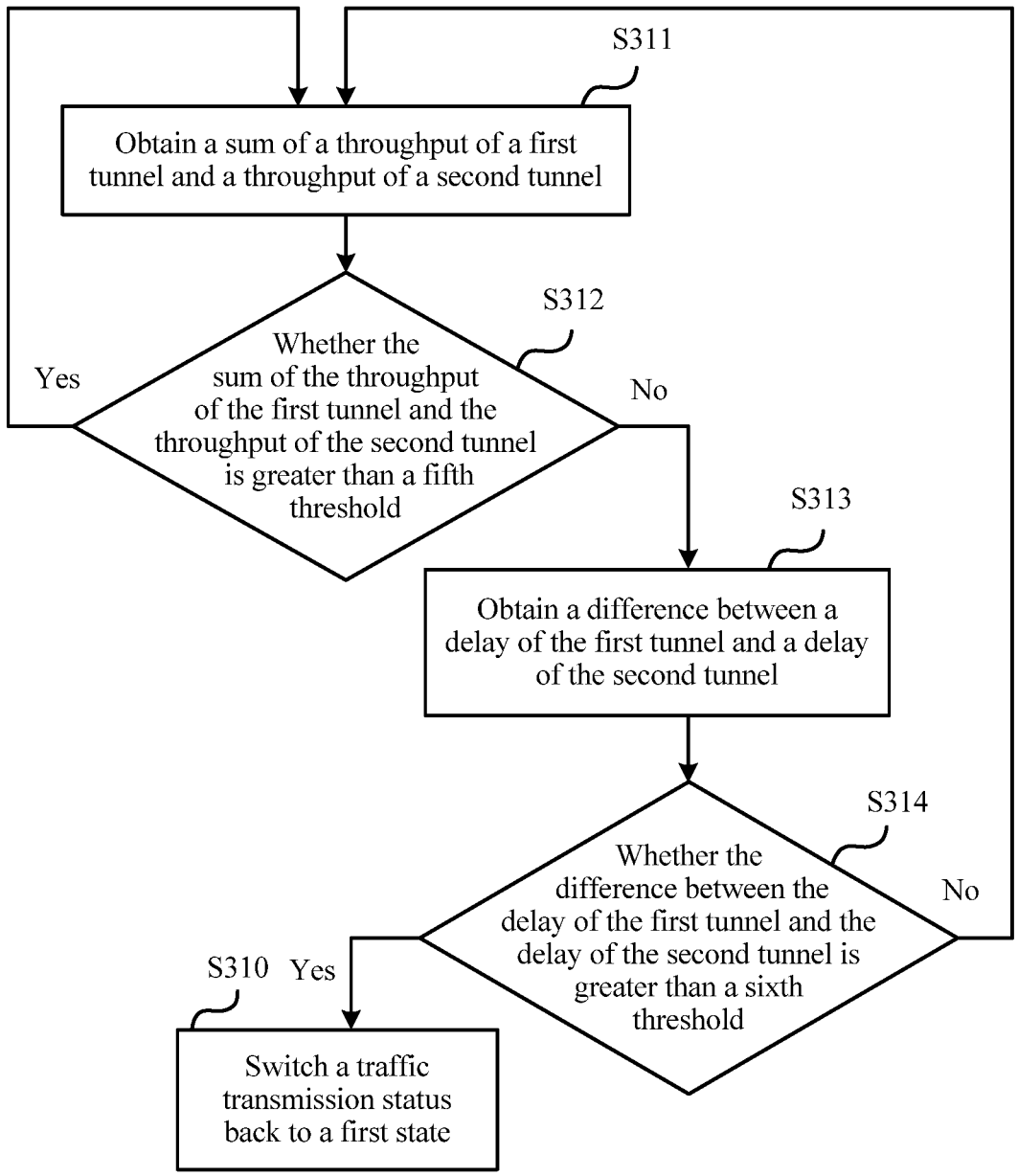
FIG. 7 is a schematic flowchart of a third state in a traffic distribution method according to an embodiment of the present disclosure.

FIG. 7 is a schematic flowchart of a third state in a traffic distribution method according to an embodiment of the present disclosure. The third state S330 includes content in S311 to S314.

S311. The HAAP obtains a sum of a throughput of the first tunnel and a throughput of the second tunnel in the third state.

S312. The HAAP determines whether the sum of the throughput of the first tunnel and the throughput of the second tunnel is greater than a fifth threshold.

The fifth threshold may be the same as a third threshold, or may be different from the third threshold.

If the sum of the throughput of the first tunnel and the throughput of the second tunnel is greater than the fifth threshold, the HAAP performs S311. The HAAP may periodically detect the sum of the throughput of the first tunnel and the throughput of the second tunnel.

If the sum of the throughput of the first tunnel and the throughput of the second tunnel is less than or equal to the fifth threshold, the HAAP performs S313.

S313. The HAAP obtains a delay difference between the first tunnel and the second tunnel, and then performs S314.

The delay difference between the first tunnel and the second tunnel is the difference between the delay of the first tunnel and the delay of the second tunnel.

S314. The HAAP determines whether the delay difference between the first tunnel and the second tunnel is greater than a sixth threshold.

If the delay difference between the first tunnel and the second tunnel is greater than the sixth threshold, the HAAP switches a traffic transmission status from the third state S330 back to the first state S310, that is, performs corresponding (6) in FIG. 3.

If the delay difference between the first tunnel and the second tunnel is less than or equal to the sixth threshold, the HAAP performs S311. The HAAP may periodically detect the delay difference between the first tunnel and the second tunnel.

It should be understood that, when the traffic transmission status is the third state, the HAAP may determine, in a plurality of manners, whether to perform status switching. For example, in FIG. 7, the HAAP uses the sum of the throughput of the first tunnel and the throughput of the second tunnel as a prior determining condition. When the sum of the throughput of the first tunnel and the throughput of the second tunnel does not meet an exit condition, the HAAP uses the difference between the delay of the first tunnel and the delay of the second tunnel as a determining condition for further determining.

Figure 8:
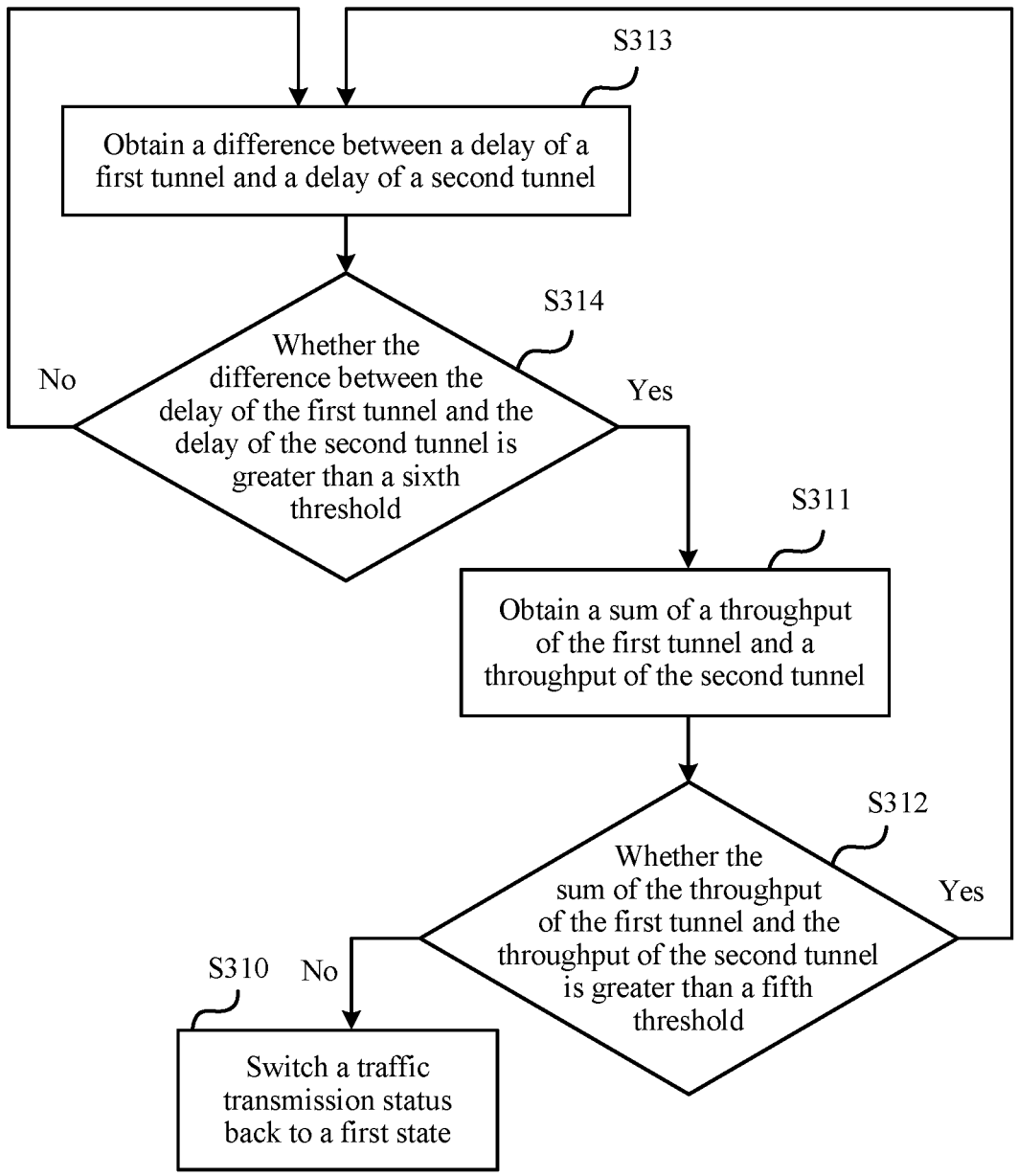
FIG. 8 is another schematic flowchart of a third state in a traffic distribution method according to an embodiment of the present disclosure.

Optionally, as shown in FIG. 8, the HAAP may use the difference between the delay of the first tunnel and the delay of the second tunnel as a prior determining condition. When the difference between the delay of the first tunnel and the delay of the second tunnel does not meet the exit condition, the HAAP determines, according to the sum of the throughput of the first tunnel and the throughput of the second tunnel, whether to switch the traffic transmission status back to the first state.

S313. The HAAP obtains a delay difference between the first tunnel and the second tunnel.

S314. The HAAP determines whether the delay difference between the first tunnel and the second tunnel is greater than a sixth threshold.

If the delay difference between the first tunnel and the second tunnel is greater than the sixth threshold, the HAAP performs S311.

If the delay difference between the first tunnel and the second tunnel is less than or equal to the sixth threshold, the HAAP performs S313. The HAAP may periodically detect the delay difference between the first tunnel and the second tunnel.

S311. The HAAP obtains a sum of a throughput of the first tunnel and a throughput of the second tunnel in the third state.

S312. The HAAP determines whether the sum of the throughput of the first tunnel and the throughput of the second tunnel is greater than a fifth threshold.

If the sum of the throughput of the first tunnel and the throughput of the second tunnel is less than or equal to the fifth threshold, the HAAP switches the traffic transmission status from the third state S330 back to the first state S310, that is, performs corresponding (6) in FIG. 3.

If the sum of the throughput of the first tunnel and the throughput of the second tunnel is greater than the fifth threshold, the HAAP performs S313. The HAAP may periodically detect the sum of the throughput of the first tunnel and the throughput of the second tunnel.

It should be understood that sequence numbers of the foregoing processes do not mean an execution sequence. The execution sequence of the processes should be determined according to functions and internal logic of the processes, and should not be construed as any limitation on the implementation processes of the embodiments of the present disclosure.

In this embodiment of the present disclosure, that the HAAP switches the traffic transmission status to the first state indicates that the HAAP performs the corresponding content in S301 to S304 shown in FIG. 4. That the HAAP switches the traffic transmission status to the second state indicates that the HAAP performs the corresponding content in S305 to S309 shown in FIG. 5 or performs the corresponding content in S308 to S307 shown in FIG. 6. That the HAAP switches the traffic transmission status to the third state indicates that the HAAP performs the corresponding content in S311 to S314 shown in FIG. 7 or performs the corresponding content in S313 to S312 shown in FIG. 8.

Figure 9:
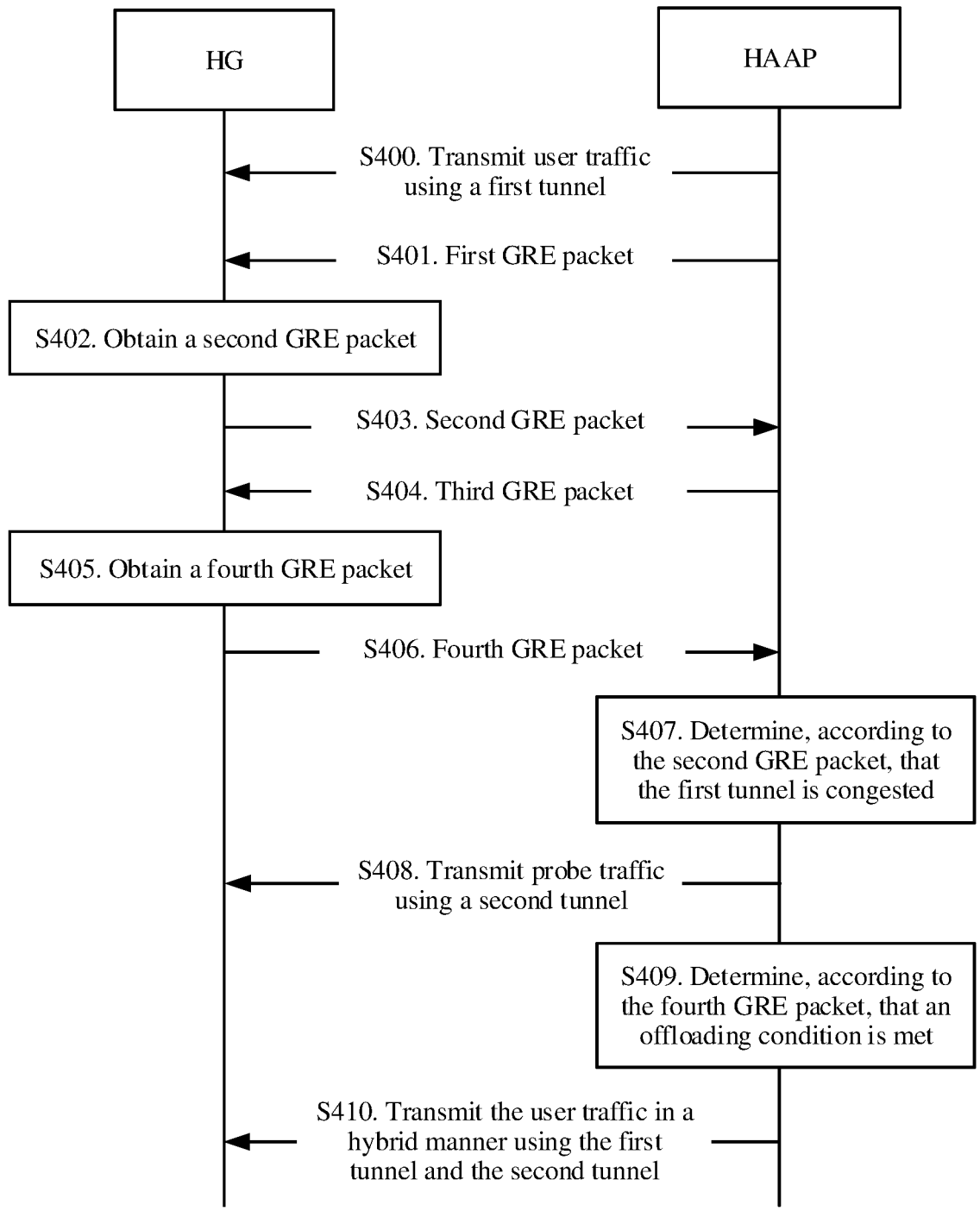
FIG. 9 is a schematic diagram of a traffic distribution method in a hybrid access network according to an embodiment of the present disclosure.

FIG. 9 is a schematic diagram of a traffic distribution method in a hybrid access network according to an embodiment of the present disclosure. As shown in FIG. 9, the traffic distribution method provided in this embodiment includes the following steps.

Step S400. An HAAP transmits user traffic using a first tunnel.

Step S401. The HAAP sends a first GRE packet to an HG.

Steps S401 and S400 may be performed at the same time, or step S401 may be performed before step S400 or after step S400. The first GRE packet is used to obtain a first parameter of the first tunnel. The first parameter of the first tunnel may reflect link quality of the first tunnel.

The HAAP may periodically send the first GRE packet to the HG.

Step S402. The HG obtains a second GRE packet.

The HG receives the first GRE packet. The HG obtains the second GRE packet according to the first GRE packet and the first parameter of the first tunnel. The second GRE packet includes the first GRE packet and the first parameter of the first tunnel.

Step S403. The HG sends the second GRE packet to the HAAP.

Step S404. The HAAP sends a third GRE packet to the HG.

The third GRE packet is used to obtain a second parameter of the first tunnel and a parameter of a second tunnel. The second parameter of the first tunnel may reflect the link quality of the first tunnel. The parameter of the second tunnel may reflect link quality of the second tunnel. The second parameter of the first tunnel may be completely the same as the first parameter of the first tunnel, or may not be completely the same as the first parameter of the first tunnel.

The HAAP may periodically send the third GRE packet to the HG.

Step S405. The HG obtains a fourth GRE packet.

The HG receives the third GRE packet. The HG obtains the fourth GRE packet according to the third GRE packet, the second parameter of the first tunnel, and the parameter of the second tunnel. The fourth GRE packet includes the third GRE packet, the second parameter of the first tunnel, and the parameter of the second tunnel.

Step S406. The HG sends the fourth GRE packet to the HAAP.

Step S407. The HAAP may determine, according to the received second GRE packet, that the first tunnel is congested, and then perform step S408.

Optionally, before step S407, the HAAP may determine, according to the first parameter of the first tunnel in the second GRE packet, whether the first tunnel is congested.

Step S408. The HAAP transmits probe traffic using a second tunnel.

Step S409. The HAAP may determine, according to the fourth GRE packet, that the first tunnel and the second tunnel meet an offloading condition.

The parameter of the second tunnel that is included in the fourth GRE packet may be a parameter obtained when the second tunnel is used to transmit the probe traffic.

Optionally, before step S409, the HAAP may determine, according to the second parameter of the first tunnel and the parameter of the second tunnel, whether the first tunnel and the second tunnel meet the offloading condition.

Step S410. The HAAP transmits the user traffic in a hybrid manner using the first tunnel and the second tunnel.

In the foregoing process, the HAAP periodically sends a GRE packet in order to obtain a parameter of the first tunnel and/or a parameter of the second tunnel in a current traffic transmission status, and adjust a user traffic transmission status according to the parameter of the first tunnel and/or the parameter of the second tunnel.

Figure 10:
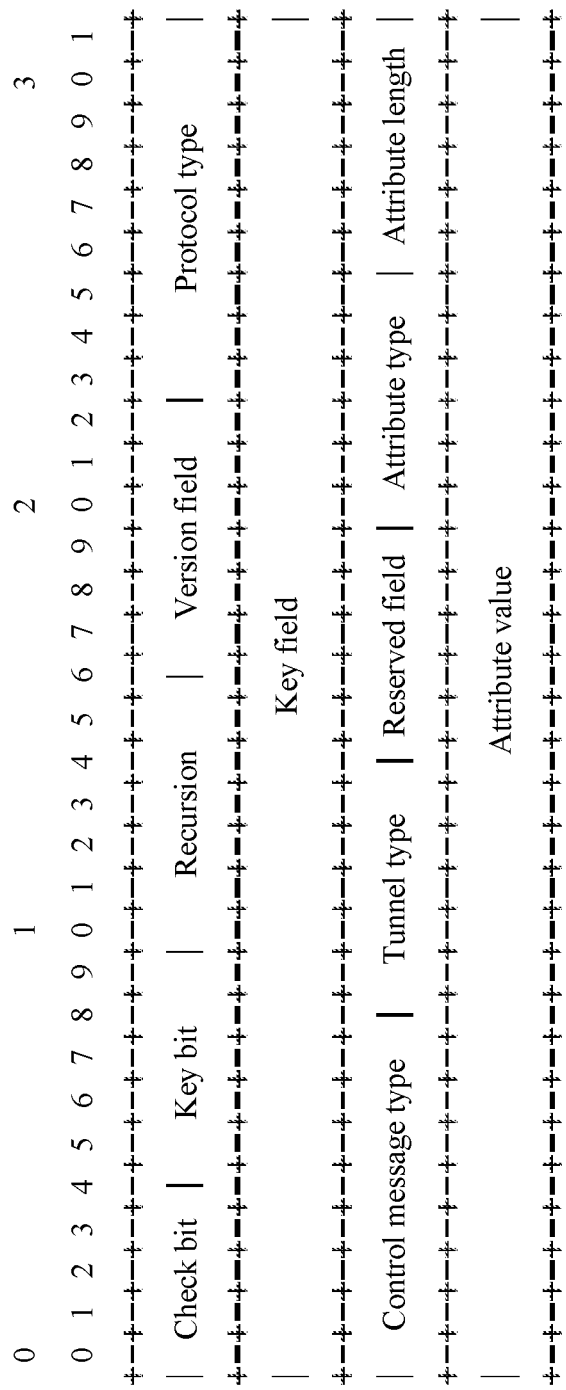
FIG. 10 is a schematic diagram of a GRE packet according to an embodiment of the present disclosure.

Further, the GRE packet may be used to measure a throughput, a packet loss rate, and a delay of a tunnel. More further, for example, the first tunnel is a DSL tunnel, and the second tunnel is an LTE tunnel. A control message type of the GRE packet is defined as 10, and a specific format is shown in FIG. 10. The GRE packet may include a check bit, a key bit, a recursion field, a version field, a protocol type, a key field, a control message type, a tunnel type, a reserved field, an attribute type, an attribute length, and an attribute value. For the check bit, if the bit is set to 1, it indicates that a checksum field is added to a GRE header, if the bit is 0, it indicates that a GRE header does not include a checksum field. For the key bit, if the bit is set to 1, it indicates that a key field is added to a GRE header, if the bit is 0, it indicates that a GRE header does not include a key field. The recursion field is used to indicate recursion of the GRE packet, and the field is used to prevent the packet from being unlimitedly encapsulated. The field is increased by 1 after GRE encapsulation is completed once. If the recursion is greater than 3, the packet is discarded. The key field is used by a tunnel receive end to verify a received packet. The tunnel type is used to indicate that the packet belongs to the DSL tunnel or the LTE tunnel.

In this embodiment of the present disclosure, Attribute Value Pairs (AVPs) included in the GRE packet are extended, and an AVP used to carry a related attribute of the DSL tunnel and an AVP used to carry a related attribute of the LTE tunnel are added. The AVP used to carry the related attribute of the DSL tunnel may be used to carry the related attribute of the DSL tunnel using an extended attribute type field, attribute length field, and attribute value field. The AVP used to carry the related attribute of the LTE tunnel may be used to carry the related attribute of the LTE tunnel using an extended attribute type field, attribute length field, and attribute value field. The related attribute of the DSL tunnel includes a parameter used to obtain a packet loss rate, a throughput, and/or a delay of the DSL tunnel. The related attribute of the LTE tunnel includes a parameter used to obtain a packet loss rate, a throughput, and/or a delay of the LTE tunnel. Specific forms and specific content of the AVPs are not illustrated herein one by one.

After receiving the second GRE packet or the fourth GRE packet that is sent by the HG, the HAAP needs to perform calculation and processing to obtain a throughput, a packet loss rate, and a delay of the first tunnel and/or a throughput, a packet loss rate, and a delay of the second tunnel. A specific calculation method is as follows.

A packet loss rate of the DSL tunnel is calculated according to the following formula:

$$\text{DSL\_PLR} = \frac{\Delta Tx - \Delta Rx}{\Delta Tx}, \text{where}$$

$$\Delta Tx = \text{Tx\_Packet\_2} - \text{Tx\_Packet\_1, and}$$

$$\Delta Rx = \text{Rx\_Packet\_2} - \text{Rx\_Packet\_1}.$$

A throughput of the DSL tunnel is calculated according to the following formula:

$$\text{DSL\_TUNNEL\_TH} = \frac{(\text{Tx\_Byte\_DSL\_TUNNEL\_2}) - (\text{Tx\_Byte\_DSL\_TUNNEL\_1})}{t_2 - t_1}.$$

A throughput of a DSL link is calculated according to the following formula:

$$\text{DSL\_BYPASS\_TH} = \frac{(\text{Tx\_Byte\_DSL\_BYPASS\_2}) - (\text{Tx\_Byte\_DSL\_BYPASS\_1})}{t_2 - t_1}.$$

A throughput of the LTE tunnel is calculated according to the following formula:

$$\text{LTE\_TUNNEL\_TH} = \frac{(\text{Tx\_Byte\_LTE\_TUNNEL\_2}) - (\text{Tx\_Byte\_LTE\_TUNNEL\_1})}{t_2 - t_1}.$$

In the foregoing formulas, Tx_Packet is a quantity of packets sent by the HAAP to the HG. Tx_Packet_2 represents a quantity of packets sent by the HAAP to the HG until a t2 moment. Tx_Packet_1 represents a quantity of packets sent by the HAAP to the HG until a t1 moment. Rx_Packet is a quantity of packets received by the HG. Rx_Packet_2 represents a quantity of packets received by the HG until the t2 moment. Rx_Packet_1 represents a quantity of packets received by the HG until the t1 moment.

In the foregoing formulas, Tx_Byte_DSL_TUNNEL is a quantity of bytes sent by the HAAP to the HG using the DSL tunnel. Tx_Byte_DSL_TUNNEL_2 represents a quantity of bytes sent by the HAAP to the HG until the t2 moment using the DSL tunnel. Tx_Byte_DSL_TUNNEL_1 represents a quantity of bytes sent by the HAAP to the HG until the t1 moment using the DSL tunnel.

Rx_Byte_DSL_TUNNEL is a quantity of bytes received by the HG using the DSL tunnel. Rx_Byte_DSL_TUNNEL_2 represents a quantity of bytes received by the HG until the t2 moment using the DSL tunnel. Rx_Byte_DSL_TUNNEL_1 represents a quantity of bytes received by the HG until the t1 moment using the DSL tunnel.

In the foregoing formulas, Tx_Byte_LTE_TUNNEL is a quantity of bytes sent by the HAAP to the HG using the LTE tunnel. Tx_Byte_LTE_TUNNEL_2 represents a quantity of bytes sent by the HAAP to the HG until the t2 moment using the LTE tunnel. Tx_Byte_LTE_TUNNEL_1 represents a quantity of bytes sent by the HAAP to the HG until the t1 moment using the LTE tunnel.

Rx_Byte_LTE_TUNNEL is a quantity of bytes received by the HG using the LTE tunnel. Rx_Byte_LTE_TUNNEL_2 represents a quantity of bytes received by the HG until the t2 moment using the LTE tunnel. Rx_Byte_LTE_TUNNEL_1 represents a quantity of bytes received by the HG until the t1 moment using the LTE tunnel.

In the foregoing formulas, Tx_Byte_DSL_BYPASS is a quantity of bytes transmitted by the HG using the DSL link. Tx_Byte_DSL_BYPASS_2 represents a quantity of bytes transmitted by the HG until the t2 moment using the DSL link. Tx_Byte_DSL_BYPASS_1 represents a quantity of bytes transmitted by the HG until the t1 moment using the DSL link.

Tx_Packet, Rx_Packet, Tx_Byte_DSL_TUNNEL, Rx_Byte_DSL_TUNNEL, Tx_Byte_LTE_TUNNEL, Rx_Byte_LTE_TUNNEL, and Tx_Byte_DSL_BYPASS are all accumulated values.

After obtaining the foregoing parameters by means of calculation, the HAAP may determine current statuses of the first tunnel and the second tunnel according to the foregoing parameters in order to correspondingly adjust a traffic transmission status of the user traffic between the HAAP and the HG.

It should be understood that sequence numbers of the foregoing processes do not mean an execution sequence. The execution sequence of the processes should be determined according to functions and internal logic of the processes, and should not be construed as any limitation on the implementation processes of the embodiments of the present disclosure.

The traffic distribution method in a hybrid access network according to the embodiments of the present disclosure is described in detail above with reference to FIG. 1 to FIG. 10, and a traffic distribution apparatus in a hybrid access network according to the embodiments of the present disclosure is described in detail below with reference to FIG. 11 and FIG. 12.

Figure 11:
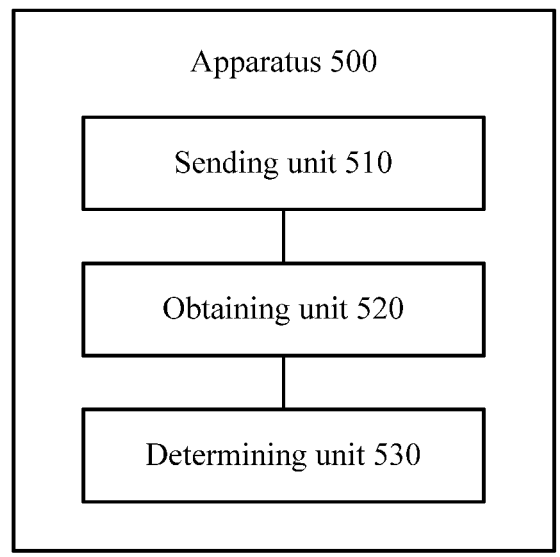
FIG. 11 is a schematic block diagram of a traffic distribution apparatus in a hybrid access network according to an embodiment of the present disclosure.

FIG. 11 shows a traffic distribution apparatus 500 in a hybrid access network according to an embodiment of the present disclosure. The apparatus 500 includes a sending unit 510, an obtaining unit 520, and a determining unit 530.

The sending unit 510 is configured to, after a first tunnel is congested when user traffic is transmitted over the first tunnel, transmit probe traffic using a second tunnel. The probe traffic is traffic, in the user traffic, used to obtain a status of the second tunnel.

The obtaining unit 520 is configured to obtain a status of the first tunnel and the status of the second tunnel.

The determining unit 530 is configured to determine, according to the status of the first tunnel and the status of the second tunnel, whether the status of the first tunnel and the status of the second tunnel meet an offloading condition.

The sending unit 510 is configured to, after the determining unit 530 determines that the status of the first tunnel and the status of the second tunnel meet the offloading condition, transmit the user traffic using the first tunnel and the second tunnel.

Optionally, the determining unit 530 is further configured to, after determining that the status of the first tunnel and the status of the second tunnel do not meet the offloading condition, determine whether the status of the first tunnel and the status of the second tunnel meet a backoff condition. The determining unit 530 is further configured to, after determining that the status of the first tunnel and the status of the second tunnel meet the backoff condition, determine whether the first tunnel is congested.

Optionally, the sending unit 510 is further configured to, after the determining unit 530 determines that the status of the first tunnel and the status of the second tunnel do not meet the backoff condition, transmit the user traffic using the first tunnel. The determining unit 530 is further configured to skip performing congestion determining on the first tunnel within preset duration.

Optionally, the determining unit 530 is further configured to, before determining that the first tunnel is congested when the user traffic is transmitted over the first tunnel, determine, according to a link quality parameter of the first tunnel and a first threshold, whether the first tunnel is congested.

The determining unit 530 is further configured to, if the link quality parameter of the first tunnel is greater than the first threshold, determine that the first tunnel is congested.

Optionally, the link quality parameter of the first tunnel is a packet loss rate of the first tunnel, and the first threshold is a threshold corresponding to the packet loss rate, the link quality parameter of the first tunnel is a throughput of the first tunnel, and the first threshold is a threshold corresponding to the throughput, or the link quality parameter of the first tunnel includes a packet loss rate of the first tunnel and a throughput of the first tunnel, the first threshold includes a first subthreshold and a second subthreshold, the first subthreshold is a threshold corresponding to the packet loss rate, and the second subthreshold is a threshold corresponding to the throughput.

Optionally, the status of the second tunnel includes a throughput of the second tunnel, and the status of the first tunnel includes a throughput of the first tunnel. The determining unit 530 is further configured to determine whether a sum of the throughput of the first tunnel and the throughput of the second tunnel is greater than a second threshold. The second threshold is a threshold corresponding to the sum of the throughput of the first tunnel and the throughput of the second tunnel.

The determining unit 530 is further configured to, if the sum of the throughput of the first tunnel and the throughput of the second tunnel is greater than the second threshold, determine that the status of the first tunnel and the status of the second tunnel meet the offloading condition.

Optionally, the determining unit 530 is further configured to determine whether the sum of the throughput of the first tunnel and the throughput of the second tunnel is less than a third threshold. The third threshold is a threshold corresponding to the sum of the throughput of the first tunnel and the throughput of the second tunnel.

The determining unit 530 is further configured to, if the sum of the throughput of the first tunnel and the throughput of the second tunnel is less than the third threshold, determine that the status of the first tunnel and the status of the second tunnel meet the backoff condition.

Optionally, the status of the second tunnel further includes a delay of the second tunnel, and the status of the first tunnel further includes a delay of the first tunnel. The determining unit 530 is further configured to determine whether a difference between the delay of the second tunnel and the delay of the first tunnel is less than a fourth threshold. The fourth threshold is a threshold corresponding to the difference between the delay of the second tunnel and the delay of the first tunnel.

The determining unit 530 is further configured to, if the sum of the throughput of the first tunnel and the throughput of the second tunnel is greater than or equal to the third threshold, and the difference between the delay of the second tunnel and the delay of the first tunnel is less than the fourth threshold, determine that the status of the first tunnel and the status of the second tunnel meet the backoff condition.

Optionally, the status of the second tunnel includes the throughput of the second tunnel and the delay of the second tunnel, and the status of the first tunnel includes the throughput of the first tunnel and the delay of the first tunnel. The determining unit 530 is further configured to determine that the sum of the throughput of the first tunnel and the throughput of the second tunnel is greater than or equal to the third threshold, and the difference between the delay of the second tunnel and the delay of the first tunnel is greater than or equal to the fourth threshold. The third threshold is the threshold corresponding to the sum of the throughput of the first tunnel and the throughput of the second tunnel, and the fourth threshold is the threshold corresponding to the difference between the delay of the second tunnel and the delay of the first tunnel.

Optionally, the status of the second tunnel includes a delay of the second tunnel, and the status of the first tunnel includes a delay of the first tunnel. The determining unit 530 is further configured to determine whether a difference between the delay of the second tunnel and the delay of the first tunnel is less than a fourth threshold. The fourth threshold is a threshold corresponding to the difference between the delay of the second tunnel and the delay of the first tunnel.

The determining unit 530 is further configured to, if the difference between the delay of the second tunnel and the delay of the first tunnel is less than the fourth threshold, determine that the status of the first tunnel and the status of the second tunnel meet the offloading condition.

Optionally, the status of the second tunnel includes a throughput of the second tunnel, and the status of the first tunnel includes a throughput of the first tunnel. The determining unit 530 is further configured to determine whether a sum of the throughput of the first tunnel and the throughput of the second tunnel is less than a third threshold. The third threshold is a threshold corresponding to the sum of the throughput of the first tunnel and the throughput of the second tunnel.

The determining unit 530 is further configured to, if the sum of the throughput of the first tunnel and the throughput of the second tunnel is less than the third threshold, determine that the status of the first tunnel and the status of the second tunnel meet the backoff condition.

Optionally, the determining unit 530 is further configured to, if the sum of the throughput of the first tunnel and the throughput of the second tunnel is greater than or equal to the third threshold and is less than or equal to a second threshold, determine that the status of the first tunnel and the status of the second tunnel do not meet the backoff condition. The second threshold is greater than the third threshold.

Optionally, the determining unit 530 is further configured to, after the sending unit 510 transmits the user traffic using the first tunnel and the second tunnel, determine whether the status of the first tunnel and the status of the second tunnel meet an exit condition. The sending unit 510 is further configured to, after the determining unit 530 determines that the status of the first tunnel and the status of the second tunnel meet the exit condition, transmit the user traffic using the first tunnel. The determining unit 530 is further configured to determine whether the first tunnel is congested.

Optionally, the status of the first tunnel includes the throughput of the first tunnel and the delay of the first tunnel, the status of the second tunnel includes the throughput of the second tunnel and the delay of the second tunnel, and the exit condition is a fifth threshold and a sixth threshold. The determining unit 530 is further configured to, if the sum of the throughput of the first tunnel and the throughput of the second tunnel is less than or equal to the fifth threshold, and the difference between the delay of the second tunnel and the delay of the first tunnel is greater than the sixth threshold, determine that the status of the first tunnel and the status of the second tunnel meet the exit condition.

Optionally, the obtaining unit 520 is further configured to receive a GRE packet sent by an HG. The GRE packet includes a parameter of the first tunnel and a parameter of the second tunnel. The determining unit 530 is further configured to obtain the status of the first tunnel and the status of the second tunnel according to the parameter of the first tunnel and the parameter of the second tunnel that are included in the GRE packet.

For example, the apparatus 500 may be further the HAAP in the foregoing embodiments. The apparatus 500 may be configured to perform the procedures and/or steps, corresponding to the HAAP, in the foregoing method embodiments. Details are not described herein again.

According to the traffic distribution apparatus in a hybrid access network in this embodiment of the present disclosure, the HAAP offloads the probe traffic to the second tunnel when detecting that the first tunnel is congested in order to probe the status of the second tunnel. After the status of the first tunnel and the status of the second tunnel meet the offloading condition, the HAAP transmits the user traffic in a hybrid manner using the first tunnel and the second tunnel. In this way, the status of the second tunnel is probed before offloading is performed such that a case in which an overall bandwidth for dual tunnel-based traffic transmission is lower than a bandwidth for single tunnel-based traffic transmission can be avoided, thereby improving user experience.

Figure 12:
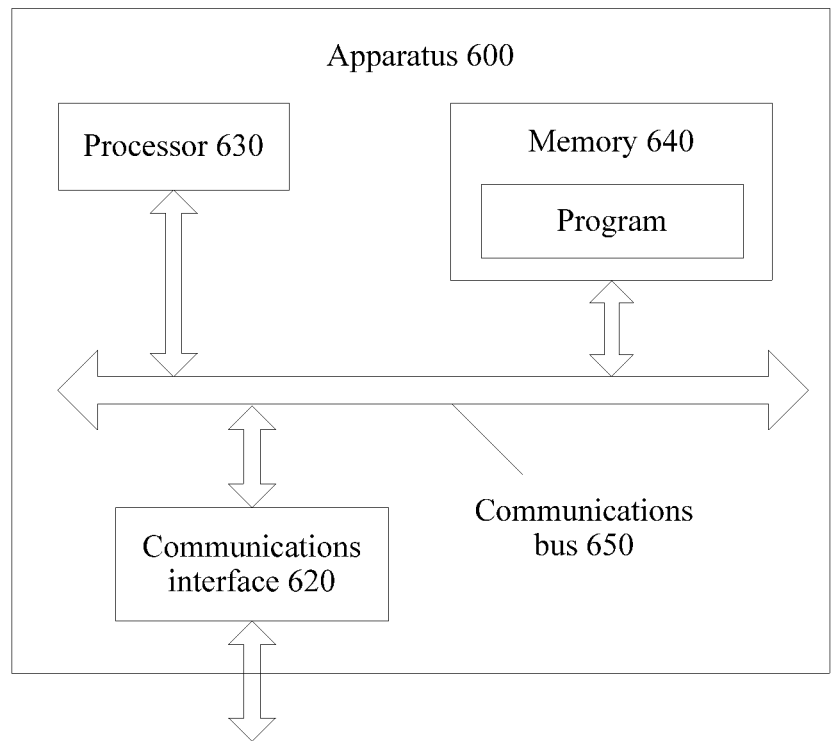
FIG. 12 is a schematic block diagram of a traffic distribution apparatus in a hybrid access network according to an embodiment of the present disclosure.

FIG. 12 shows a traffic distribution apparatus 600 in a hybrid access network according to an embodiment of the present disclosure. The apparatus 600 includes a communications interface 620, a processor 630, a memory 640, and a communications bus 650. The communications interface 620, the processor 630, and the memory 640 are connected using the bus system 650. The memory 640 is configured to store an instruction. The traffic distribution apparatus 600 may be disposed on the HAAP in any one of the embodiments corresponding to FIG. 2 to FIG. 9, and may use the method used by the HAAP in the embodiments corresponding to FIG. 2 to FIG. 9. The traffic distribution apparatus 600 and the traffic distribution apparatus 500 may be a same apparatus.

The processor 630 reads a program from the memory 640, and performs the following operations according to the instruction corresponding to the program.

After determining that a first tunnel is congested when user traffic is transmitted over the first tunnel, the processor 630 transmits probe traffic through the communications interface 620 using a second tunnel. The probe traffic is traffic, in the user traffic, used to obtain a status of the second tunnel.

The processor 630 obtains a status of the first tunnel and the status of the second tunnel.

The processor 630 determines, according to the status of the first tunnel and the status of the second tunnel, whether the status of the first tunnel and the status of the second tunnel meet an offloading condition.

After determining that the status of the first tunnel and the status of the second tunnel meet the offloading condition, the processor 630 transmits the user traffic through the communications interface 620 using the first tunnel and the second tunnel.

The communications interface 620 may receive and send data and/or information using the first tunnel and/or the second tunnel.

Optionally, the processor 630 may further perform, according to the instruction stored in the memory 640, the steps and/or procedures performed by the HAAP in any one of the embodiments corresponding to FIG. 2 to FIG. 9. Details are not described herein again.

Optionally, the memory 640 may include a read-only memory (ROM) and a random access memory (RAM). A part of the memory may further include a nonvolatile RAM (NVRAM).

Specific values of thresholds in the embodiments of the present disclosure may be set according to a requirement, and are not illustrated herein one by one. In a possible implementation, a first threshold may be set to a first proportion of a bandwidth of a DSL tunnel, the second threshold may be set to a sum of a second proportion of a bandwidth of the DSL tunnel and the second proportion of a bandwidth of an LTE tunnel, and the third threshold may be set to a sum of a third proportion of a bandwidth of the DSL tunnel and a third proportion of a bandwidth of an LTE tunnel. The first proportion, the second proportion, and the third proportion may be set according to a requirement, and are not illustrated herein.

In the embodiments of the present disclosure, the processor in the apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor, or the like.

In an implementation process, the steps in the foregoing methods may be completed by means of an integrated logic circuit of hardware in the processor or an instruction in a form of software. The steps of the method disclosed with reference to the embodiments of the present disclosure may be directly performed by a hardware processor, or may be performed using a combination of hardware in the processor and a software unit. The software unit may be located in a mature storage medium in the art, such as a RAM, a flash memory, a ROM, a programmable ROM (PROM), an electrically erasable PROM (EEPROM), or a register. The storage medium is located in the memory, and the processor executes the instruction in the memory and completes the steps in the methods in combination with hardware of the processor.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions in the embodiments of the present disclosure.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

In addition, the function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of the present disclosure essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A traffic distribution method in a hybrid access network, comprising:
   transmitting, by a hybrid access aggregation point (HAAP), probe traffic using a second tunnel after determining that a first tunnel is congested when user traffic is transmitted over the first tunnel, wherein the probe traffic is a first part of the user traffic and is used to obtain a first status of the second tunnel;
   obtaining, by the HAAP, a second status of the first tunnel transmitting a second part of the user traffic and the first status of the second tunnel transmitting the probe traffic;
   determining, by the HAAP according to the second status of the first tunnel and the first status of the second tunnel, whether the second status of the first tunnel and the first status of the second tunnel meet an offloading condition;
   transmitting, by the HAAP, a third part of the user traffic using the first tunnel and a fourth part of the user traffic using the second tunnel after determining that the second status of the first tunnel and the first status of the second tunnel meet the offloading condition;
   monitoring, by the HAAP, a third status of the first tunnel and a fourth status of the second tunnel while the HAAP transmits the third part of the user traffic using the first tunnel and the fourth part of the user traffic using the second tunnel; and
   switching, by the HAAP, from transmitting the third part of the user traffic using the first tunnel and the fourth part of the user traffic using the second tunnel to transmitting all of the user traffic using the first tunnel after determining that the third status of the first tunnel and the fourth status of the second tunnel meet an exit condition, wherein the exit condition comprises throughputs or delays associated with the first tunnel and the second tunnel.

2. The traffic distribution method of claim 1, wherein the first status of the second tunnel comprises a throughput of the second tunnel, wherein the second status of the first tunnel comprises a throughput of the first tunnel, wherein determining whether the second status of the first tunnel and the first status of the second tunnel meet the offloading condition comprises determining, by the HAAP, whether a sum of the throughput of the first tunnel and the throughput of the second tunnel is greater than a second threshold, and wherein the second threshold is a threshold corresponding to the sum of the throughput of the first tunnel and the throughput of the second tunnel.

3. The traffic distribution method of claim 2, wherein determining that the second status of the first tunnel and the first status of the second tunnel meet the offloading condition comprises determining, by the HAAP, that the second status of the first tunnel and the first status of the second tunnel meet the offloading condition when the sum of the throughput of the first tunnel and the throughput of the second tunnel is greater than the second threshold.

4. The traffic distribution method of claim 2, wherein determining whether the second status of the first tunnel and the first status of the second tunnel meet the offloading condition comprises determining, by the HAAP, whether the sum of the throughput of the first tunnel and the throughput of the second tunnel is less than a third threshold, and wherein the third threshold is a threshold corresponding to the sum of the throughput of the first tunnel and the throughput of the second tunnel.

5. The traffic distribution method of claim 4, wherein determining that the second status of the first tunnel and the first status of the second tunnel meet the offloading condition comprises determining, by the HAAP, that the second status of the first tunnel and the first status of the second tunnel meet the offloading condition when the sum of the throughput of the first tunnel and the throughput of the second tunnel is less than the third threshold.

6. The traffic distribution method of claim 4, wherein the first status of the second tunnel further comprises a delay of the second tunnel, wherein the second status of the first tunnel further comprises a delay of the first tunnel, wherein determining whether the second status of the first tunnel and the first status of the second tunnel meet the offloading condition comprises determining, by the HAAP, whether a difference between the delay of the second tunnel and the delay of the first tunnel is less than a fourth threshold, and wherein the fourth threshold is a threshold corresponding to the difference between the delay of the second tunnel and the delay of the first tunnel.

7. The traffic distribution method of claim 6, wherein determining that the second status of the first tunnel and the first status of the second tunnel meet the offloading condition comprises determining, by the HAAP, that the second status of the first tunnel and the first status of the second tunnel meet the offloading condition when the sum of the throughput of the first tunnel and the throughput of the second tunnel is greater than or equal to the third threshold and the difference between the delay of the second tunnel and the delay of the first tunnel is less than the fourth threshold.

8. The traffic distribution method of claim 2, wherein the first status of the second tunnel further comprises a delay of the second tunnel, wherein the second status of the first tunnel further comprises a delay of the first tunnel, wherein determining that the second status of the first tunnel and the first status of the second tunnel do not meet the offloading condition comprises determining, by the HAAP, that the sum of the throughput of the first tunnel and the throughput of the second tunnel is greater than or equal to a third threshold and a difference between the delay of the second tunnel and the delay of the first tunnel is greater than or equal to a fourth threshold, wherein the third threshold is a threshold corresponding to the sum of the throughput of the first tunnel and the throughput of the second tunnel, and wherein the fourth threshold is a threshold corresponding to the difference between the delay of the second tunnel and the delay of the first tunnel.

9. The traffic distribution method of claim 1, wherein the first status of the second tunnel comprises a delay of the second tunnel, wherein the second status of the first tunnel comprises a delay of the first tunnel, wherein determining whether the second status of the first tunnel and the first status of the second tunnel meet the offloading condition comprises determining, by the HAAP, whether a difference between the delay of the second tunnel and the delay of the first tunnel is less than a fourth threshold, and wherein the fourth threshold is a threshold corresponding to the difference between the delay of the second tunnel and the delay of the first tunnel.

10. The traffic distribution method of claim 9, wherein determining that the second status of the first tunnel and the first status of the second tunnel meet the offloading condition comprises determining, by the HAAP, that the second status of the first tunnel and the first status of the second tunnel meet the offloading condition when the difference between the delay of the second tunnel and the delay of the first tunnel is less than the fourth threshold.

11. A traffic distribution apparatus in a hybrid access network, comprising:
a non-transitory computer-readable storage medium configured to store programming instructions; and
a processor coupled to the non-transitory computer-readable storage medium, wherein the programming instructions cause the processor to be configured to:
transmit probe traffic using a second tunnel after a first tunnel is congested when user traffic is transmitted over the first tunnel, wherein the probe traffic is a first part of the user traffic and is used to obtain a first status of the second tunnel;
obtain a second status of the first tunnel transmitting a second part of the user traffic and the first status of the second tunnel transmitting the probe traffic;
determine, according to the second status of the first tunnel and the first status of the second tunnel, whether the second status of the first tunnel and the first status of the second tunnel meet an offloading condition;
transmit a third part of the user traffic using the first tunnel and a fourth part of the user traffic using the second tunnel after determining that the second status of the first tunnel and the first status of the second tunnel meet the offloading condition;
monitor a third status of the first tunnel and a fourth status of the second tunnel while the third part of the user traffic is transmitted using the first tunnel and the fourth part of the user traffic is transmitted using the second tunnel; and
switch from transmitting the third part of the user traffic using the first tunnel and the fourth part of the user traffic using the second tunnel to transmitting all of the user traffic using the first tunnel after determining that the third status of the first tunnel and the fourth status of the second tunnel meet an exit condition, wherein the exit condition comprises throughputs or delays associated with the first tunnel and the second tunnel.

12. The traffic distribution apparatus of claim 11, wherein the first status of the second tunnel comprises a throughput of the second tunnel, wherein the second status of the first tunnel comprises a throughput of the first tunnel, wherein the programming instructions further cause the processor to be configured to determine whether a sum of the throughput of the first tunnel and the throughput of the second tunnel is greater than a second threshold, and wherein the second threshold is a threshold corresponding to the sum of the throughput of the first tunnel and the throughput of the second tunnel.

13. The traffic distribution apparatus of claim 12, wherein the programming instructions further cause the processor to be configured to determine that the second status of the first tunnel and the first status of the second tunnel meet the offloading condition when the sum of the throughput of the first tunnel and the throughput of the second tunnel is greater than the second threshold.

14. The traffic distribution apparatus of claim 12, wherein the programming instructions further cause the processor to be configured to determine whether the sum of the throughput of the first tunnel and the throughput of the second tunnel is less than a third threshold, and wherein the third threshold is a threshold corresponding to the sum of the throughput of the first tunnel and the throughput of the second tunnel.

15. The traffic distribution apparatus of claim 14, wherein the programming instructions further cause the processor to be configured to determine that the second status of the first tunnel and the first status of the second tunnel meet the offloading condition when the sum of the throughput of the first tunnel and the throughput of the second tunnel is less than the third threshold.

16. The traffic distribution apparatus of claim 14, wherein the first status of the second tunnel further comprises a delay of the second tunnel, wherein the second status of the first tunnel further comprises a delay of the first tunnel, wherein the programming instructions further cause the processor to be configured to determine whether a difference between the delay of the second tunnel and the delay of the first tunnel is less than a fourth threshold, and wherein the fourth threshold is a threshold corresponding to the difference between the delay of the second tunnel and the delay of the first tunnel.

17. The traffic distribution apparatus of claim 16, wherein the programming instructions further cause the processor to be configured to determine that the second status of the first tunnel and the first status of the second tunnel meet the offloading condition when the sum of the throughput of the first tunnel and the throughput of the second tunnel is greater than or equal to the third threshold and the difference between the delay of the second tunnel and the delay of the first tunnel is less than the fourth threshold.

18. The traffic distribution apparatus of claim 12, wherein the first status of the second tunnel further comprises a delay of the second tunnel, wherein the second status of the first tunnel further comprises a delay of the first tunnel, wherein the programming instructions further cause the processor to be configured to determine that the sum of the throughput of the first tunnel and the throughput of the second tunnel is greater than or equal to a third threshold and a difference between the delay of the second tunnel and the delay of the first tunnel is greater than or equal to a fourth threshold, wherein the third threshold is a threshold corresponding to the sum of the throughput of the first tunnel and the throughput of the second tunnel, and wherein the fourth threshold is a threshold corresponding to the difference between the delay of the second tunnel and the delay of the first tunnel.

19. The traffic distribution apparatus of claim 11, wherein the first status of the second tunnel comprises a delay of the second tunnel, wherein the second status of the first tunnel comprises a delay of the first tunnel, wherein the programming instructions further cause the processor to be configured to determine whether a difference between the delay of the second tunnel and the delay of the first tunnel is less than a fourth threshold, and wherein the fourth threshold is a threshold corresponding to the difference between the delay of the second tunnel and the delay of the first tunnel.

20. The traffic distribution apparatus of claim 19, wherein the programming instructions further cause the processor to be configured to determine that the second status of the first tunnel and the first status of the second tunnel meet the offloading condition when the difference between the delay of the second tunnel and the delay of the first tunnel is less than the fourth threshold.

* * * * *